(12) United States Patent
Park et al.

(10) Patent No.: US 9,055,281 B2
(45) Date of Patent: Jun. 9, 2015

(54) SOURCE DEVICE AND SINK DEVICE AND METHOD OF TRANSMITTING AND RECEIVING MULTIMEDIA SERVICE AND RELATED DATA

(75) Inventors: Hong-seok Park, Anyang-si (KR); Jae-seung Kim, Yongin-si (KR); Jae-jun Lee, Suwon-si (KR); Yong-seok Jang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1024 days.

(21) Appl. No.: 13/112,464

(22) Filed: May 20, 2011

(65) Prior Publication Data

US 2011/0285818 A1 Nov. 24, 2011

Related U.S. Application Data

(60) Provisional application No. 61/346,596, filed on May 20, 2010.

(30) Foreign Application Priority Data

Apr. 25, 2011 (KR) .................. 10-2011-0038443

(51) Int. Cl.
*H04N 5/932* (2006.01)
*H04N 5/935* (2006.01)
*H04N 5/775* (2006.01)
*H04N 9/80* (2006.01)
*H04N 13/00* (2006.01)
*H04N 5/66* (2006.01)
*H04N 9/12* (2006.01)

(52) U.S. Cl.
CPC ....... *H04N 13/0059* (2013.01); *H04N 13/0048* (2013.01); *H04N 13/0066* (2013.01); *H04N 13/007* (2013.01)

(58) Field of Classification Search
USPC .................. 386/200–234, 239–248, 326–357
See application file for complete search history.

(56) References Cited

U.S. PATENT DOCUMENTS

| | | | |
|---|---|---|---|
| 2001/0050679 A1* | 12/2001 | Shigeta | 345/204 |
| 2007/0274689 A1* | 11/2007 | Stone | 386/123 |
| 2010/0033627 A1* | 2/2010 | Hayashi et al. | 348/500 |
| 2010/0182402 A1* | 7/2010 | Nakajima et al. | 348/42 |
| 2010/0253680 A1* | 10/2010 | Kobayashi | 345/419 |
| 2010/0277567 A1* | 11/2010 | Takizuka et al. | 348/43 |
| 2010/0321479 A1* | 12/2010 | Yang | 348/51 |
| 2012/0054664 A1* | 3/2012 | Dougall et al. | 715/772 |
| 2012/0249736 A1* | 10/2012 | Barrett et al. | 348/43 |
| 2013/0083167 A1* | 4/2013 | Miyauchi | 348/46 |
| 2014/0376880 A1* | 12/2014 | Oh et al. | 386/231 |

FOREIGN PATENT DOCUMENTS

WO   WO 2010/008012 A1 *  1/2010  ............. H04N 7/173

\* cited by examiner

*Primary Examiner* — Hung Dang
(74) *Attorney, Agent, or Firm* — Sughrue Mion, PLLC

(57) ABSTRACT

A source device and a sink device and a method of transmitting and receiving a multimedia service therebetween. A method of transmitting a multimedia service from a source device includes: generating uncompressed media data from media provided in the multimedia service; determining reproduction information of the media for a sink device and three-dimensional (3D) video reproduction information of 3D video for the sink device to reproduce the 3D video; and generating media auxiliary data including at least one of the reproduction information and the 3D video reproduction information and outputting the media auxiliary data and the uncompressed media data through the display interface.

18 Claims, 28 Drawing Sheets

FIG. 6

| InfoFrame Type Code | Type of InfoFrame |
|---|---|
| 0x00 | Reserved |
| 0x01 | Vendor Specific |
| 0x02 | Auxiliary Video Information |
| 0x03 | Source Product Description |
| 0x04 | Audio |
| 0x05 | MPEG Source |
| 0x06 | NTSC VBI |
| 0x07-0xFF | Reserved for future use |

FIG. 7

| | | | | | | | | |
|---|---|---|---|---|---|---|---|---|
| InfoFrame Type Code | InfoFrame Type = 0x02 | | | | | | | |
| InfoFrame Version Number | Version = 0x02 | | | | | | | |
| Length of AVI InfoFrame | Length of AVI InfoFrame (13) | | | | | | | |
| Data Byte 1 | F17=0 | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | F47=0 | VIC6 | VIC5 | VIC4 | VIC3 | VIC2 | VIC1 | VIC0 |
| Data Byte 5 | YQ1 | YQ0 | CN1 | CN0 | PR3 | PR2 | PR1 | PR0 |
| Data Byte 6 | ETB07–ETB00 (Line Number of End of Top Bar – lower 8 bits) | | | | | | | |
| Data Byte 7 | ETB15–ETB08 (Line Number of End of Top Bar – upper 8 bits) | | | | | | | |
| Data Byte 8 | SBB07–SBB00 (Line Number of Start of Bottom Bar – lower 8 bits) | | | | | | | |
| Data Byte 9 | SBB15–SBB08 (Line Number of Start of Bottom Bar – upper 8 bits) | | | | | | | |
| Data Byte 10 | ELB07–ELB00 (Pixel Number of End of Left Bar – lower 8 bits) | | | | | | | |
| Data Byte 11 | ELB15–ELB08 (Pixel Number of End of Left Bar – upper 8 bits) | | | | | | | |
| Data Byte 12 | SRB07–SRB00 (Pixel Number of Start of Right Bar – lower 8 bits) | | | | | | | |
| Data Byte 13 | SRB15–SRB08 (Pixel Number of Start of Right Bar – upper 8 bits) | | | | | | | |

FIG. 8

| Byte/Bit # | 7 | 6 | 5 | 4 | 3 | 2 | 1 | 0 |
|---|---|---|---|---|---|---|---|---|
| HB0 | Packet Type = 0x81 ||||||||
| HB1 | Version = 0x01 ||||||||
| HB2 | 0 | 0 | 0 | 0 | 0 | Length = Nv |||

FIG. 9

| Packet Byte # | 7 | 6 | 5 | 4 | 3 | 2 | 1 | 0 |
|---|---|---|---|---|---|---|---|---|
| PB0 | Checksum ||||||||
| PB1 | 24bit IEEE Registration Identifier (0x000C03) ( least significant byte first ) ||||||||
| PB2 | ||||||||
| PB3 | ||||||||
| PB4 | HDMI_Video_Format ||| Rsvd(0) | Rsvd(0) | Rsvd(0) | Rsvd(0) | Rsvd(0) |
| (PB5) | 3D_Structure |||| Reserved(0) ||||
| (PB6) | 3D_Ext_Data |||| Reserved(0) ||||
| ..PB(Nv) | Reserved(0) ||||||||

FIG. 11

| Codes | Type of Data Block |
|---|---|
| 0 | Reserved |
| 1 | Audio Data Block (includes one or more Short Audio Descriptors) |
| 2 | Video Data Block (includes one or more Short Video Descriptors) |
| 3 | Vendor Specific Data Block |
| 4 | Speaker Allocation Data Block |
| 5 | VESA DTC Data Block |
| 6 | Reserved |
| 7 | Use Extended tag |

| | Byte# | Bits 5-7 | Bits 0-4 |
|---|---|---|---|
| Video Data Block | 1 | Video Tag Code | length = total number of video bytes following this byte ($L_1$) |
| | 2 | CEA Short Video Descriptor 1 | |
| | 3 | CEA Short Video Descriptor 2 | |
| | ... | ... | |
| | $1+L_1$ | CEA Short Video Descriptor L | |
| Audio Data Block | $2+L_1$ | Audio Tag Code | length = total number of audio bytes following this byte ($L_2$) |
| | $3+L_1$ | CEA Short Audio Descriptor 1 | |
| | $4+L_1$ | | |
| | $5+L_1$ | | |
| | ... | ... | |
| | $L_1+L_2$ | CEA Short Audio Descriptor 3 | |
| | $1+L_1+L_2$ | | |
| | $2+L_1+L_2$ | | |
| Speaker Allocation Data Block | $3+L_1+L_2$ | Speaker Allocation Tag Code | length=total number of speaker allocation bytes following this byte ($L_3=3$) |
| | $4+L_1+L_2$ | Speaker Allocation Data Block Payload (3 bytes) | |
| | $5+L_1+L_2$ | | |
| | $6+L_1+L_2$ | | |
| Vendor Specific Data Block | $7+L_1+L_2$ | Vendor Specific Tag Code | length=total number of vendor specific bytes following this byte ($L_4$) |
| | $8+L_1+L_2$ | 24-bit IEEE Registration Identifier (least Significant byte first) | |
| | $9+L_1+L_2$ | | |
| | $10+L_1+L_2$ | | |
| | ... | Vendor Specific Data Block Payload (L -3 bytes) | |
| Video Capability Data Block | $8+L_1+L_2+L_4$ | Extended Tag Code | length=total number of bytes in this block following this byte ($L_5$) |
| | $9+L_1+L_2+L_4$ | Video Capabilities Ext. Tag Code = 00h | |
| | $10+L_1+L_2+L_4$ | Video Capabilities Data Byte 3 | |

| Address | Example Data | | Name of Block | Description |
|---|---|---|---|---|
| Hex | Hex | Dec | | |
| 0x00 | 0x00 | 0 | | |
| 0x01 | 0xFF | 255 | | |
| 0x02 | 0xFF | 255 | | |
| 0x03 | 0xFF | 255 | | |
| 0x04 | 0xFF | 255 | | |
| 0x05 | 0xFF | 255 | | |
| 0x06 | 0xFF | 255 | | |
| 0x07 | 0x00 | 0 | | |
| 0x08 | 0x0C | 12 | Name of Block | Manufacturer Name |
| 0x09 | 0xA1 | 161 | | |
| 0x0A | 0x00 | 00 | | Product Code |
| 0x0B | 0x00 | 0 | | |
| 0x0C | 0x00 | 00 | | Serial Number |
| 0x0D | 0x00 | 00 | | |
| 0x0E | 0x00 | 00 | | |
| 0x0F | 0x00 | 00 | | |
| 0x10 | 0x00 | 0 | | Week of Manufacture |
| 0x11 | 0x0C | 12 | | Year of Manufacture |
| 0x12 | 0x01 | 1 | EDID Structure Version / Revision | Version # |
| 0x13 | 0x03 | 3 | | Revision # |
| 0x14 | 0x80 | 128 | Basic Display Parameters / Features | Video Input Definition |
| 0x15 | 0x50 | 80 | | Max. Horizontal Image Size in cm |
| 0x16 | 0x2D | 45 | | Max. Vertical Image Size in cm |
| 0x17 | 0x78 | 120 | | Gamma: (gamma x 100)−100 = value |
| 0x18 | 0x0A | 10 | | Feature Support |

| | | | | | | | | |
|---|---|---|---|---|---|---|---|---|
| InfoFrame Type Code | InfoFrame Type = 0x02 | | | | | | | |
| InfoFrame Version Number | Version = 0x02 | | | | | | | |
| Length of AVI InfoFrame | Length of AVI InfoFrame (13) | | | | | | | |
| Data Byte 1 | F17=0 | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | F47=0 | VIC6 | VIC5 | VIC4 | VIC3 | VIC2 | VIC1 | VIC0 |
| Data Byte 5 | YQ1 | YQ0 | CN1 | CN0 | PR3 | PR2 | PR1 | PR0 |
| Data Byte 6 | ETB07–ETB00 (Line Number of End of Top Bar – lower 8 bits) | | | | | | | |
| Data Byte 7 | ETB15–ETB08 (Line Number of End of Top Bar – upper 8 bits) | | | | | | | |
| Data Byte 8 | SBB07–SBB00 (Line Number of Start of Bottom Bar – lower 8 bits) | | | | | | | |
| Data Byte 9 | SBB15–SBB08 (Line Number of Start of Bottom Bar – upper 8 bits) | | | | | | | |
| Data Byte 10 | ELB07–ELB00 (Pixel Number of End of Left Bar – lower 8 bits) | | | | | | | |
| Data Byte 11 | ELB15–ELB08 (Pixel Number of End of Left Bar – upper 8 bits) | | | | | | | |
| Data Byte 12 | SRB07–SRB00 (Pixel Number of Start of Right Bar – lower 8 bits) | | | | | | | |
| Data Byte 13 | SRB15–SRB08 (Pixel Number of Start of Right Bar – upper 8 bits) | | | | | | | |
| Data Byte XX | 3d_parameter | | | | | | | |

FIG. 31

| | Byte# | Bit 5-7 | Bit0-4 |
|---|---|---|---|
| 3D Parameter Data Block | 1 | 3D Parameter Tag Code ( 7 ) | Length of following data block payload (in bytes) |
| | 2 | Extended Tag Code | |
| | ... | 3d_parameter | |

| Extended Tag Codes | Type of Data Block |
|---|---|
| 0 | Video Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colorimetry Data Block |
| 6...15 | Reserved for video-related blocks |
| 16 | CEA Miscellaneous Audio Fields |
| 17 | Vendor-Specific Audio Data Block |
| 18 | Reserved for HDMI Audio Data Block |
| 19...31 | Reserved for audio-related blocks |
| 32...255 | Reserved for general |

SOURCE DEVICE AND SINK DEVICE AND METHOD OF TRANSMITTING AND RECEIVING MULTIMEDIA SERVICE AND RELATED DATA

CROSS-REFERENCE TO RELATED PATENT APPLICATION

This application claims the benefit of U.S. Provisional Patent Application No. 61/346,596, filed on May 20, 2010, in the U.S. Patent and Trademark Office, and priority from Korean Patent Application No. 10-2011-0038443, filed on Apr. 25, 2011, in the Korean Intellectual Property Office, the disclosures of which are incorporated herein in their entirety by reference.

BACKGROUND

1. Field

Methods and apparatuses consistent with exemplary embodiments relate to a source device and a sink device for transmitting and receiving data through a display interface.

2. Description of the Related Art

A source device, such as a set-top box, and a sink device, such as a display device, may be connected to each other through a display interface so that media data can be transmitted between the source device and the sink device through the display interface.

The source device may provide auxiliary information regarding media to the sink device so that the sink device can smoothly reproduce the received media data. The auxiliary information regarding media may also be transmitted through the display interface.

The sink device may provide information regarding display capability and supportable media formats of the sink device to the source device through the display interface.

SUMMARY

One or more exemplary embodiments provide a method of transmitting/receiving and utilizing auxiliary information regarding media for reproducing the media including three-dimensional (3D) video of a sink device from a source device to the sink device.

One or more exemplary embodiments also provide a method of transmitting/receiving and utilizing display characteristic information for reproducing media including 3D video of a sink device from the sink device to a source device.

According to an aspect of an exemplary embodiment, there is provided a method of transmitting a multimedia service by a source device through a display interface, the method including: generating uncompressed media data from media provided in the multimedia service; determining reproduction information of the media for a sink device for receiving the multimedia service through the display interface to reproduce the media and 3D video reproduction information of 3D video for the sink device to reproduce the 3D video; and generating media auxiliary data including at least one of the reproduction information of the media and the 3D video reproduction information of the 3D video and having a data structure recognizable by the sink device and outputting the media auxiliary data and the uncompressed media data through the display interface.

The 3D video reproduction information may include at least one of 3D video transfer format providing information, which indicates a format of left-view video data and right-view video data of the 3D video that compose the uncompressed media data, and 3D screen maximum disparity information, which indicates the maximum disparity in a 3D screen of the 3D video.

According to an aspect of another an exemplary embodiment, there is provided a method of transmitting display characteristic data by a sink device through a display interface, the method including: determining at least one of display characteristic information of the sink device to reproduce media provided in a multimedia service and 3D display characteristic information of the sink device to receive and reproduce 3D video provided in the multimedia service; and generating display characteristic data including at least one of the display characteristic information and the 3D display characteristic information and having a data structure recognizable by a source device for transmitting the multimedia service through the display interface and outputting the display characteristic data through the display interface.

The 3D display characteristic information of the sink device may include 3D video format support information indicating a 3D video transfer format in which the sink device can perform 3D reproduction among 3D video transfer formats of left-view video data and right-view video data of the 3D video that compose uncompressed media data.

According to an aspect of another exemplary embodiment, there is provided a method of receiving a multimedia service by a sink device through a display interface, the method including: receiving media auxiliary data of a data structure recognizable by the sink device and uncompressed media data of media provided in the multimedia service from a source device through the display interface; and extracting from the media auxiliary data at least one of reproduction information of the media provided in the multimedia service to receive and reproduce the media and 3D video reproduction information of 3D video provided in the multimedia service to receive and reproduce the 3D video.

The method may further include reproducing the media by using the uncompressed media data based on at least one of the reproduction information of the media and the 3D video reproduction information of the 3D video.

According to an aspect of another exemplary embodiment, there is provided a method of receiving display characteristic data by a source device through a display interface, the method including: receiving display characteristic data of a data structure recognizable by the source device from a sink device for receiving a multimedia service transmitted from the source device through the display interface; and extracting from the display characteristic data at least one of display characteristic information of the sink device to reproduce media provided in the multimedia service and 3D display characteristic information of the sink device to receive and reproduce 3D video provided in the multimedia service.

The method may further include determining uncompressed media data to be transmitted to the sink device based on at least one of the display characteristic information and the 3D display characteristic information.

According to an aspect of another exemplary embodiment, there is provided a source device for transmitting a multimedia service through a display interface, the source device including: a media data generator for generating uncompressed media data from media provided in the multimedia service; a reproduction information determiner for determining at least one of reproduction information of the media for a sink device for receiving the multimedia service through the display interface to reproduce the media and 3D video reproduction information of 3D video for the sink device to reproduce the 3D video; and a media related data output unit for generating media auxiliary data including at least one of the reproduction information of the media and the 3D video reproduction information of the 3D video and having a data structure recognizable by the sink device and outputting the media auxiliary data and the uncompressed media data through the display interface.

According to an aspect of another exemplary embodiment, there is provided a sink device for transmitting display characteristic data through a display interface, the sink device including: a display characteristic information determiner for determining at least one of display characteristic information of the sink device to reproduce media provided in a multimedia service and 3D display characteristic information of the sink device to receive and reproduce 3D video provided in the multimedia service; and a display characteristic data output unit for generating display characteristic data including at least one of the display characteristic information and the 3D display characteristic information and having a data structure recognizable by a source device for transmitting the multimedia service through the display interface and outputting the display characteristic data through the display interface.

According to an aspect of another exemplary embodiment, there is provided a sink device for receiving a multimedia service through a display interface, the sink device including: a media related data receiver for receiving media auxiliary data of a data structure recognizable by the sink device and uncompressed media data of media provided in the multimedia service from a source device through the display interface; and a reproduction information extractor for extracting from the media auxiliary data at least one of reproduction information of the media provided in the multimedia service to receive and reproduce the media and 3D video reproduction information of 3D video provided in the multimedia service to receive and reproduce the 3D video; and a media reproducing unit for reproducing the media by using the uncompressed media data based on at least one of the reproduction information of the media and the 3D video reproduction information of the 3D video.

According to an aspect of another exemplary embodiment, there is provided a source device for receiving display characteristic data through a display interface, the source device including: a display characteristic data receiver for receiving display characteristic data of a data structure recognizable by the source device from a sink device for receiving a multimedia service transmitted from the source device through the display interface; and a display characteristic information extractor for extracting from the display characteristic data at least one of display characteristic information of the sink device to reproduce media provided in the multimedia service and 3D display characteristic information of the sink device to receive and reproduce 3D video provided in the multimedia service; and a media data determiner for determining uncompressed media data to be transmitted to the sink device based on at least one of the display characteristic information and the 3D display characteristic information.

According to an aspect of another exemplary embodiment, there is provided a computer-readable recording medium storing a computer-readable program for implementing the method of transmitting a multimedia service by a source device through a display interface with a computation processor.

According to an aspect of another exemplary embodiment, there is provided a computer-readable recording medium storing a computer-readable program for implementing the method of transmitting display characteristic data by a sink device through a display interface with a computation processor.

According to an aspect of another exemplary embodiment, there is provided a computer-readable recording medium storing a computer-readable program for implementing the method of receiving a multimedia service by a sink device through a display interface with a computation processor.

According to an aspect of another exemplary embodiment, there is provided a computer-readable recording medium storing a computer-readable program for implementing the method of receiving display characteristic data by a source device through a display interface with a computation processor.

BRIEF DESCRIPTION OF THE DRAWINGS

The above and other aspects and advantages will become more apparent by the following detailed description of exemplary embodiments with reference to the attached drawings in which:

FIG. 6 is an InfoFrame type table based on Consumer Electronics Association (CEA) 861 standard;

FIG. 7 illustrates an InfoFrame format of an Auxiliary Video InfoFrame (AVI) InfoFrame;

FIGS. 8 and 9 are structures of a packet header and a packet content of a High-Definition Multimedia Interface (HDMI)-based vendor specific InfoFrame, respectively;

FIGS. 11 and 12 show a table of data block types and a data block collection format, respectively;

FIG. 21 shows an HDMI-based EDID data format;

FIG. 29 illustrates an extended format of an AVI InfoFrame for transmitting and receiving 3D video reproduction information according to an exemplary embodiment;

FIG. 31 shows a case in which a user extension data block of EDID data is used to transmit and receive 3D display characteristic information according to an exemplary embodiment;

DETAILED DESCRIPTION

Exemplary embodiments will now be described more fully with reference to the accompanying drawings.

Hereinafter, with reference to FIGS. 1 to 36, a method of transmitting and receiving media reproduction information of media and display characteristic information of a sink device by a source device for transmitting media data through a display interface and the sink device for receiving the media data through the display interface according to exemplary embodiments are described.

A method of determining auxiliary information of media for media reproduction in a sink device and transmitting the auxiliary information of the media to the sink device through a display interface from a source device for transmitting media data through the display interface according to an exemplary embodiment and a structure of the source device for the method are described.

A method of reproducing media by receiving at a sink device auxiliary information of the media from a source device through a display interface and a structure of the sink device for the method are described.

A method of determining display characteristic information for media reproduction by a sink device and transmitting the display characteristic information to a source device through a display interface from the sink device for transmitting the display characteristic information through the display interface according to an exemplary embodiment and a structure of the sink device for the method are described.

A method of selecting media to be transmitted by receiving, at a source device, display characteristic information from a sink device through a display interface and a structure of the source device for the method are described.

A source device and a sink device transmit and receive media data through a display interface. In order for the source device to transmit a multimedia service to the sink device, the source device transmits, to the sink device, media data of media provided in the multimedia service. The sink device reproduces the media by using the received media data.

The source device and the sink device may transmit and receive additional data besides the media data through the display interface.

A source device according to an exemplary embodiment may include a set-top box, a Digital Video Recorder (DVR), a video decoder, and a broadcast receiver. A sink device according to an exemplary embodiment may be one of a digital television (TV), a monitor, a video receiver, and a display device.

Hereinafter, a source device 100 and a sink device 200 according to an exemplary embodiment for transmitting and receiving reproduction information of media or 3D video reproduction information according to an exemplary embodiment through a display interface are described in detail with reference to FIGS. 1 and 2.

Figure 1:
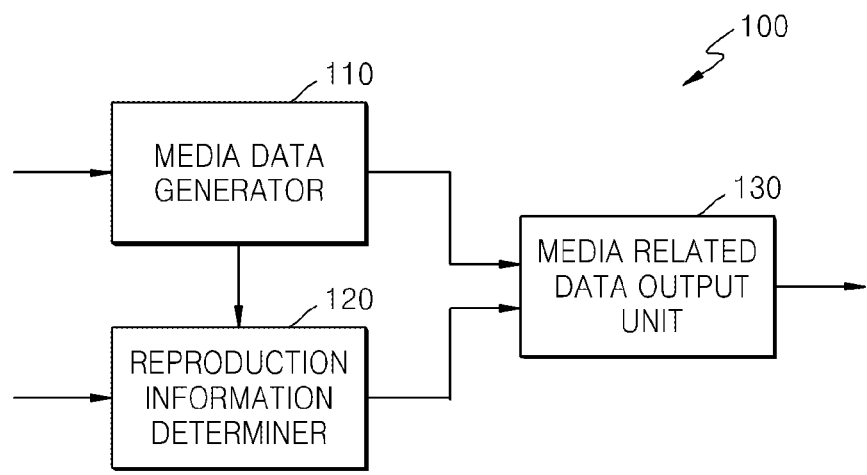
FIG. 1 is a block diagram of a source device for transmitting a multimedia service through a display interface, according to an exemplary embodiment.

FIG. 1 is a block diagram of the source device 100 for transmitting a multimedia service through a display interface according to an exemplary embodiment.

Referring to FIG. 1, the source device 100 for transmitting a multimedia service through a display interface according to an exemplary embodiment includes a media data generator 110, a reproduction information determiner 120, and a media related data output unit 130.

Hereinafter, for convenience of description, 'the source device 100 for transmitting a multimedia service through a display interface according to an exemplary embodiment' is simply referred to as 'the source device 100'.

The source device 100 provides the multimedia service through a data transmission channel of the display interface to the sink device 200 connected through the display interface.

The media data generator 110 generates and outputs uncompressed media data of media provided in the multimedia service. The media data generator 110 may generate the uncompressed media data by receiving encoded media data from the outside and decoding the encoded media data.

The reproduction information determiner 120 may determine media reproduction information including media characteristic information required for the sink device 200 to reproduce media. When 3D video is provided in the multimedia service, the reproduction information determiner 120 may determine 3D video reproduction information including 3D video characteristic information required for the sink device 200 to reproduce 3D video.

The reproduction information determiner 120 may determine at least one of the media reproduction information and the 3D video reproduction information. The type of video reproduction information determined by the reproduction information determiner 120 may vary according to whether the media data generator 110 outputs two-dimensional (2D) video data or 3D video data or which format of video data the media data generator 110 outputs.

The media related data output unit 130 may generated and output media auxiliary data including at least one of the media reproduction information and the 3D video reproduction information determined by the reproduction information determiner 120. The media related data output unit 130 may output the media auxiliary data in a data structure recognizable by the sink device 200.

The media related data output unit 130 may output the uncompressed media data and the media auxiliary data through the display interface. The media related data output unit 130 may transmit the uncompressed media data and the media auxiliary data to the sink device 200 through a data transmission channel of the display interface.

Hereinafter, various embodiments of the media reproduction information and the 3D video reproduction information determined by the reproduction information determiner 120 are described in detail.

The 3D video reproduction information may include 3D video transfer format providing information of uncompressed 3D video data generated by the media data generator 110. The 3D video transfer format providing information may provide information including left-view video data and right-view video data of a 3D video to transmit uncompressed 3D video.

The 3D video transfer format providing information may include information indicating at least one of a side-by-side format, a top-and-bottom format, a frame packing format, a frame/field sequential format, and a multi-view video format.

The frame/field sequential format may indicate a 3D video transfer format in which left-view video data and right-view video data of 3D video are alternately transferred in each vertical screen interval.

If the 3D video transfer format is the frame/field sequential format, the 3D video transfer format providing information may further include at least one of left/right identification information indicating a view type of video data transferred in a current vertical screen interval and left/right order information indicating an order of a current frame among a pair of left-view frame and right-view frame.

The multi-view video format may indicate 3D video transfer format of multi-view video data having three or more views, which is transmitted to the sink device 200.

The 3D video reproduction information may include 3D screen maximum disparity information of the uncompressed 3D video data generated by the media data generator 110.

The 3D screen maximum disparity information may indicate a maximum disparity occurring in a 3D screen displayed by synthesizing left-view video data and right-view video data of the uncompressed 3D video data output from the source device 100.

The 3D screen maximum disparity information may indicate a maximum disparity occurring in a 3D screen formed by synthesizing at least one of per-view video data, subtitle data, and application data of 3D video of the uncompressed 3D video data output from the source device 100.

The media reproduction information may include game mode change information for directing the sink device 200 to change to a game mode. If the sink device 200 supports a game mode, the source device 100 may transmit game mode change information to the sink device 200 for directing whether to change to the game mode.

The media reproduction information may include division screen identification information of division video data obtained by dividing video data of a single screen into a plurality of pieces. The media related data output unit 130 may divide video data of a single screen into a plurality of pieces of division video data and output the division video data. The division screen identification information may include division numbers indicating an order in which the division video data forms a screen.

The media related data output unit 130 may generate media auxiliary data including the division screen identification information of the division video data and transmit the media auxiliary data together with the plurality of pieces of division video data through the display interface.

The plurality of pieces of division video data may be transmitted after a vertical synchronization signal is generated, wherein a single piece of division video data may be transmitted in a vertical screen interval between two vertical synchronization signals. The media related data output unit 130 may transmit division screen identification information of division video data following a vertical synchronization signal by being synchronized with the vertical synchronization signal.

The media related data output unit 130 may sequentially output the plurality of pieces of division video data through a single display interface according to division numbers of the division screen identification information. The media related data output unit 130 may transmit division screen identification information of division video data following a vertical synchronization signal generated before the transmission of the division video data.

The media related data output unit 130 may respectively transmit division video data through a plurality of display interfaces. The media related data output unit 130 may transmit corresponding division video data after a vertical synchronization signal is generated for each of the plurality of display interfaces.

The source device 100 may transmit uncompressed media data and media auxiliary data through display interfaces, such as an HDMI, an Institute of Electrical and Electronics Engineers (IEEE) 1394 interface, a DisplayPort interface, and Digital Visual Interface (DVI).

For example, the media related data output unit 130 may generate media auxiliary data in an AVI format based on HDMI. In this case, the media related data output unit 130 may extend a data field of the AVI InfoFrame and insert at least one of media reproduction information and 3D video reproduction information into the extended data field.

For example, the media related data output unit 130 may generate media auxiliary data in an InfoFrame format based on HDMI. In this case, the media related data output unit 130 may insert at least one of media reproduction information and 3D video reproduction information into at least one of a reserved InfoFrame and a user extension InfoFrame of the InfoFrame.

Figure 2:
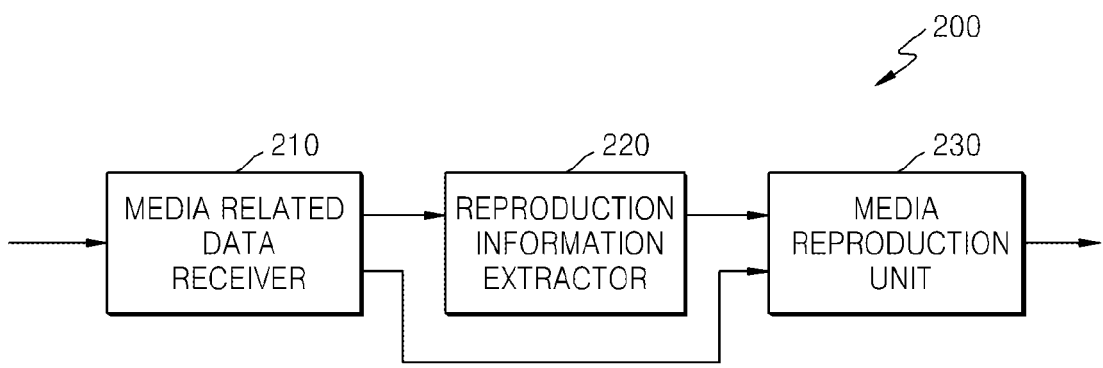
FIG. 2 is a block diagram of a sink device for receiving a multimedia service through a display interface, according to an exemplary embodiment.

FIG. 2 is a block diagram of the sink device 200 for receiving a multimedia service through a display interface, according to an exemplary embodiment.

Referring to FIG. 2, the sink device 200 for receiving a multimedia service through a display interface includes a media related data receiver 210, a reproduction information extractor 220, and a media reproduction unit 230.

Hereinafter, for convenience of description, 'the sink device 200 for receiving a multimedia service through a display interface according to an exemplary embodiment' is simply referred to as 'the sink device 200'.

The sink device 200 receives the multimedia service through a data transmission channel of the display interface from the source device 100 connected through the display interface.

The media related data receiver 210 receives media auxiliary data and uncompressed media data from the source device 100 through the display interface.

The media auxiliary data may be transmitted through a data transmission channel of the display interface and have a data structure recognizable by the sink device 200. The media related data receiver 210 may receive uncompressed media data of media provided in the multimedia service.

The reproduction information extractor 220 may extract at least one of media reproduction information and 3D video reproduction information from the media auxiliary data received by the media related data receiver 210.

The media reproduction unit 230 may reproduce media by using the uncompressed media data received by the media related data receiver 210. The media reproduction unit 230 may form and reproduce media by using the uncompressed media data based on at least one of the media reproduction information and the 3D video reproduction information extracted by the reproduction information extractor 220.

If the media related data receiver 210 has received only uncompressed 2D video data, the reproduction information extractor 220 may extract only media reproduction information from the media auxiliary data. The media reproduction unit 230 may reproduce 2D video by using the media reproduction information and the uncompressed media data.

If the media related data receiver 210 has received uncompressed 3D video data, the reproduction information extractor 220 may further extract 3D video reproduction information in addition to media reproduction information from the media auxiliary data. The media reproduction unit 230 may form and reproduce 3D video of a reproducible format by using the media reproduction information, the 3D video reproduction information, and the uncompressed media data.

The media reproduction information and the 3D video reproduction information extracted by the reproduction information extractor 220 correspond to the media reproduction information and the 3D video reproduction information transmitted by the source device, respectively. Hereinafter, embodiments in which the sink device 200 reproduces media by using the media reproduction information and the 3D video reproduction information are described in detail.

The reproduction information extractor 220 may extract 3D video transfer format providing information from the 3D video reproduction information. The reproduction information extractor 220 may read based on the 3D video transfer format providing information that received uncompressed 3D video data has any one of the side-by-side format, the top-and-bottom format, the frame packing format, the frame/field sequential format, and the multi-view video format.

If currently received uncompressed 3D video data has the frame/field sequential format, the media related data receiver 210 may alternately receive left-view video data and right-view video data of 3D video in every vertical screen interval.

If currently received uncompressed 3D video data has the frame/field sequential format, the reproduction information extractor 220 may further extract at least one of left/right identification information and left/right order information from 3D video transfer format providing information.

The reproduction information extractor 220 may read based on the left/right identification information whether a frame transmitted in a current vertical screen interval is a left-view frame or a right-view frame.

The reproduction information extractor 220 may read an order of a current frame among a pair of left-view frame and right-view frame based on the left/right order information.

If currently received uncompressed 3D video data has the multi-view video format, the media related data receiver 210 may receive multi-view video data having three or more views.

The reproduction information extractor 220 may extract 3D screen maximum disparity information from the 3D video reproduction information. The reproduction information extractor 220 may read a maximum disparity in a 3D screen formed by synthesizing at least one of per-view video data, subtitle data, and application data of 3D video output from the source device 100.

The media reproduction unit 230 may determine depths or disparities of unique application data, Electronic Program Guide (EPG) data, and subtitle data of the sink device 200 to be additionally synthesized in a 3D screen by the sink device 200 based on the maximum disparity in a 3D synthesis screen of the source device 100, which is read by the reproduction information extractor 220. For example, the media reproduction unit 230 may determine the depths or disparities of unique application data, EPG data, and subtitle data of the sink device 200 to be additionally synthesized in a 3D screen so that each depth or disparity is greater than the maximum disparity in a 3D synthesis screen of the source device 100.

The media reproduction unit 230 may perform 3D reproduction by additionally synthesizing a screen on which the unique application data, EPG data, and subtitle data of the sink device 200 with the 3D synthesis screen of the source device 100.

The reproduction information extractor 220 may extract game mode change information from the media reproduction information. The media reproduction unit 230 may determine based on the extracted game mode change information whether media of uncompressed media data is reproduced in a currently set reproduction mode or a game mode by changing to the game mode. For example, if game content is received from the source device 100 and then if game mode change information directing a change to the game mode is received from the source device 100, the media reproduction unit 230 may reproduce the game content in the game mode.

The media related data receiver 210 may receive uncompressed video data obtained by dividing video data of a single screen into a plurality of pieces. The reproduction information extractor 220 may extract division screen identification information from the media reproduction information. The media reproduction unit 230 may form and reproduce the plurality of pieces of division video data in a single screen based on the division screen identification information of the division video data.

The media related data receiver 210 may receive a single piece of division video data every time a vertical synchronization signal is generated. The media related data receiver 210 may receive division screen identification information of division video data following a vertical synchronization signal every time the vertical synchronization signal is generated.

For example, the media related data receiver 210 may sequentially receive a plurality of pieces of division video data according to division numbers of division screen identification information through a single display interface. The division screen identification information may be received every time a vertical synchronization signal is generated between intervals in which division video data is received.

For example, the media related data receiver 210 may receive division screen identification information of division video data following a vertical synchronization signal generation time, through a plurality of display interfaces. The media related data receiver 210 may receive corresponding division video data through each of the plurality of display interfaces after a vertical synchronization signal is generated.

The sink device 200 may receive the uncompressed media data and the media auxiliary data through display interfaces, such as an HDMI, an IEEE 1394 interface, a DisplayPort interface, and a DVI.

For example, the media related data receiver 210 may receive media auxiliary data in an AVI InfoFrame format based on HDMI. In this case, the reproduction information extractor 220 may extract at least one of media reproduction information and 3D video reproduction information from an extended data field of the AVI InfoFrame.

For example, the media related data receiver 210 may receive media auxiliary data in an InfoFrame format based on HDMI. In this case, the reproduction information extractor 220 may extract at least one of media reproduction information and 3D video reproduction information from at least one of a reserved InfoFrame and a user extension InfoFrame of the InfoFrame.

Hereinafter, a sink device 300 and a source device 400 for transmitting and receiving display characteristic information or 3D display characteristic information of the sink device 300 through a display interface according to an exemplary embodiment are described with reference to FIGS. 3 and 4.

Figure 3:
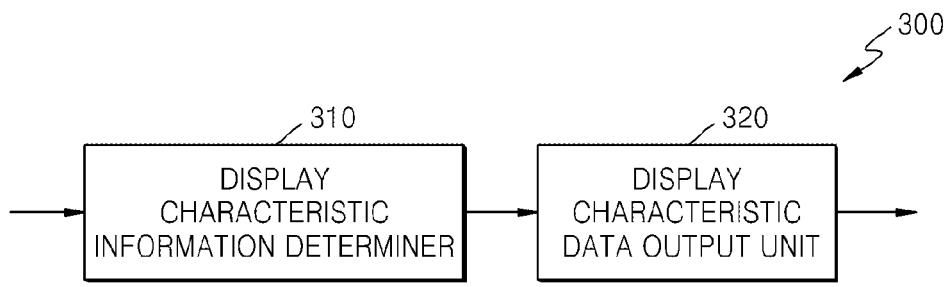
FIG. 3 is a block diagram of a sink device for transmitting display characteristic data through a display interface, according to an exemplary embodiment.

FIG. 3 is a block diagram of the sink device 300 for transmitting display characteristic data through a display interface, according to an exemplary embodiment.

The sink device 300 for transmitting display characteristic data through a display interface according to an exemplary embodiment includes a display characteristic information determiner 310 and a display characteristic data output unit 320.

Hereinafter, for convenience of description, 'the sink device 300 for transmitting display characteristic data through a display interface according to an exemplary embodiment' is simply referred to as 'the sink device 300'.

The sink device 300 provides display characteristic data to the source device 400, which is connected to the sink device 300 through the display interface, through a display characteristic information transmission channel of the display interface.

The display characteristic information determiner 310 determines display characteristic information of the sink device 300, which is required to reproduce uncompressed media data received from the source device 400. In order for the sink device 300 to receive uncompressed media data of a media format supported by the sink device 300 from the source device 400, the display characteristic information of the sink device 300 may include information regarding the media format supported by the sink device 300 and be provided to the source device 400.

For example, the media format supported by the sink device 300 may include a transfer format that is a media format, which is transmitted from the source device 400 and can be recognized by the sink device 300 when the sink device 300 receives it, and a reproduction format that is a media format reproducible by the sink device 300. After receiving media data of a recognizable transfer format, the sink device 300 may transform the received media data to media data of a reproducible reproduction format and reproduce the media data of the reproducible reproduction format.

The display characteristic information determiner 310 determines 3D display characteristic information of the sink device 300, which is required to reproduce uncompressed 3D video data received from the source device 400, in order to receive uncompressed 3D video data of a 3D video format supported by the sink device 300 through the display interface from the source device 400 providing a multimedia service of 3D video.

The display characteristic data output unit 320 generates display characteristic data including at least one of the display characteristic information and the 3D display characteristic information and outputs the display characteristic data through the display interface. The display characteristic data output unit 320 may generate display characteristic data of a data structure recognizable by the source device 400 and transmit the display characteristic data to the source device 400 through the display interface.

Hereinafter, various embodiments of the display characteristic information and the 3D display characteristic information of the sink device 300, which are determined by the display characteristic information determiner 310, are described in detail.

The 3D display characteristic information may include 3D video format support information indicating a 3D video format recognizable or reproducible by the sink device 300. The 3D video format support information may include a 3D video transfer format indicating a recognizable 3D video format or a 3D video reproduction format indicating a reproducible 3D video format among 3D video data received by the sink device 300.

The 3D video format support information may include at least one of the side-by-side format, the top-and-bottom format, the frame packing format, the frame/field sequential format, and the multi-view video format.

For example, if the sink device 300 can support the frame/field sequential format that is a 3D video transfer format in which left-view video data and right-view video data of 3D video are alternately transferred in every vertical screen interval, the display characteristic information determiner 310 may determine that the 3D video format support information includes frame/field sequential format information.

If the sink device 300 supports a 3D video format of the frame/field sequential format, the 3D video format support information may further include at least one of left/right identification information indicating a view type of a frame transferred in a current vertical screen interval and left/right order information indicating an order of a pair of left-view frame and right-view frame.

For example, if the sink device 300 can support a multi-view video format that is a 3D video transfer format in which multi-view video data having three or more views is transmitted, the display characteristic information determiner 310 may determine that the 3D video format support information includes multi-view video format information.

When the sink device 300 supports a 3D video transfer format of a multi-view video format, the 3D video format support information may further include at least one of multi-view video format information indicating a 3D video transfer format of multi-view video data having three or more views, view number information indicating the number of views of multi-view video, and view order information indicating an order of the views of the multi-view video.

The 3D display characteristic information may include 3D video depth adjustment information to adjust depths of left-view video and right-view video so that the sink device 300 can perform 3D reproduction of 3D video to be suitable for hardware characteristics.

Even if the depths of the 3D video are the same, a cubic effect felt by a user may vary according to a display size or a pixel interval size of the sink device 300, so a case in which the depths of the 3D video should be adjusted may occur. In this case, the display characteristic information determiner 310 may determine that the 3D video depth adjustment information includes at least one of information regarding a display size and information regarding a pixel interval size.

The 3D display characteristic information may include 3D video latency information. The 3D video latency information may indicate a latency time occurring when the sink device 300 reproduces 3D video. The 3D video latency information may include at least one of 3D reconstruction delay information, 2D/3D video transform delay information, and view extension delay information.

The 3D reconstruction delay information may indicate a delay time according to a 3D video reconstruction operation in which the sink device 300 generates a video reproduction format of left-view video and right-view video by using 3D video data of a 3D video transfer format and performs 3D reproduction of the left-view video and the right-view video.

The 2D/3D video transform delay information may indicate a delay time according to a 2D/3D transform operation in which the sink device 300 transforms a video reproduction format of 2D video to a video reproduction format of left-view video and right-view video of 3D video and performs 3D reproduction of the 3D video.

The view extension delay information may indicate a delay time according to a new view generation operation in which the sink device 300 generates new view video by using per-video having two or more views in a multi-view video format and performs 3D reproduction of the new view video.

The display characteristic information may include game mode support information indicating whether the sink device 300 supports a game mode. The sink device 300 may omit an additional video processing operation in which a video latency time may occur when media of game content is reproduced in the game mode.

The display characteristic information may include division screen display support information indicating whether the sink device 300 has division screen display capability by which the sink device 300 can receive division video data obtained by dividing video data of a single screen into a plurality of pieces, form a single screen with the division video data, and reproduce the division video data.

For example, the sink device 300 may sequentially receive a plurality of pieces of division video data according to division numbers of division screen identification information through a single display interface every time a vertical synchronization signal is generated.

For example, the sink device 300 may receive, through a plurality of display interfaces, division screen identification information of division video data following a vertical synchronization signal in synchronization with the vertical synchronization signal and receive corresponding division video data following the division screen identification information.

If the sink device 300 can form a single screen with a plurality of pieces of division video data based on division screen identification information of division video data and reproduce the division video data, the display characteristic information determiner 310 may determine division screen display support information so as to indicate that the sink device 300 has division screen display capability.

The 3D display characteristic information may include 3D display characteristic information which can be updated at an arbitrary time. The 3D display characteristic information may include user 3D usage information which is updated every time a user's usage pattern is changed based on at least one of a user's usage frequency and a user's current usage pattern of the sink device 300.

For example, the user 3D usage information may include at least one of information regarding a watching distance when a user watches 3D media, information regarding a watching age of the user watching the 3D media, and information regarding 3D glasses of the user, wherein all pieces of information are registered in the sink device 300.

The sink device 300 may transmit display characteristic data through display interfaces, such as an HDMI, an IEEE 1394 interface, a DisplayPort interface, and a DVI. For example, when the display characteristic data output unit 320 generates display characteristic data in an HDMI-based Enhanced EDID (E-EDID) data format, the display characteristic data output unit 320 may insert at least one of 3D display characteristic information and display characteristic information into at least one of a reserved data block and a user extension data block of E-EDID data.

The display characteristic data output unit 320 may insert at least one of the 3D display characteristic information and the display characteristic information into an extended data field of a vendor specific data block of the E-EDID data.

Figure 4:
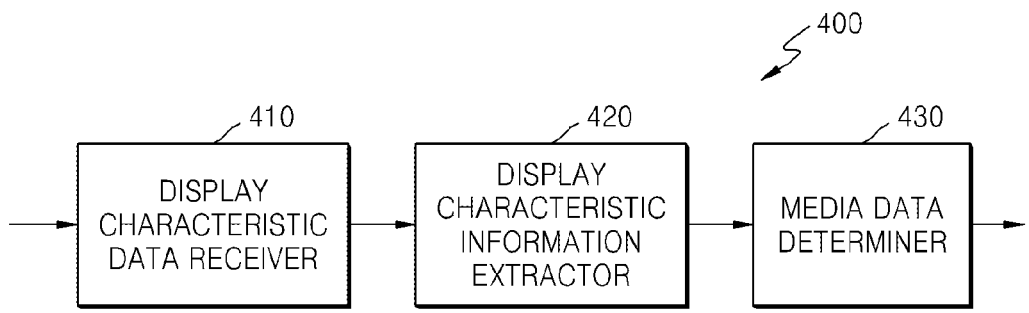
FIG. 4 is a block diagram of a source device for receiving display characteristic data through a display interface, according to an exemplary embodiment.

FIG. 4 is a block diagram of the source device 400 for receiving display characteristic data through a display interface according to an exemplary embodiment.

The source device 400 for receiving display characteristic data through a display interface according to an exemplary embodiment includes a display characteristic data receiver 410, a display characteristic information extractor 420, and a media data determiner 430.

Hereinafter, for convenience of description, 'the source device 400 for receiving display characteristic data through a display interface according to an exemplary embodiment' is simply referred to as 'the source device 400'.

The source device 400 receives display characteristic data from the sink device 300, which is connected through the display interface, through a display characteristic information transmission channel of the display interface.

The display characteristic data receiver 410 receives display characteristic data having a data structure recognizable by the source device 400 from the sink device 300 through the display interface.

The display characteristic information extractor 420 extracts at least one of display characteristic information and 3D display characteristic information of the sink device 300 from the display characteristic data.

The media data determiner 430 determines uncompressed media data to be transmitted to the sink device 300 based on at least one of the display characteristic information and the 3D display characteristic information.

The source device 400 may transmit the uncompressed media data determined by the media data determiner 430 to the sink device 300 through the display interface.

The source device 400 may re-determine media auxiliary data of the determined uncompressed media data after the uncompressed media data is determined by the media data determiner 430 and transmit the media auxiliary data to the sink device 300 through the display interface.

The display characteristic information and the 3D display characteristic information extracted by the display characteristic information extractor 420 correspond to the display characteristic information and the 3D display characteristic information of the sink device 300, which have been transmitted from the sink device 300, respectively. Hereinafter, embodiments in which the source device 400 uses the display characteristic information and the 3D display characteristic information are described in detail.

The display characteristic information extractor 420 may extract 3D video format support information indicating a 3D video format supported by the sink device 300 from the 3D display characteristic information of the sink device 300. The 3D video format supported by the sink device 300 may include a 3D video transfer format recognizable by the sink device 300 and a 3D video reproduction format reproducible by the sink device 300.

The display characteristic information extractor 420 may read which 3D video format the sink device 300 supports from among the side-by-side format, the top-and-bottom format, the frame packing format, the frame/field sequential format, and the multi-view video format based on the 3D video format support information.

For example, the display characteristic information extractor 420 may read that the sink device 300 supports the frame/field sequential format, based on the 3D video format support information. In this case, the media data determiner 430 may alternately transmit left-view video data and right-view video data of uncompressed 3D video data in every vertical screen interval.

For example, the display characteristic information extractor 420 may read that the sink device 300 supports the multi-view video format, based on the 3D video format support information. In this case, the media data determiner 430 may transmit uncompressed multi-view video data having three or more views according to the multi-view video format.

If the sink device 300 supports the multi-view video format, the display characteristic information extractor 420 may extract information regarding the number of views of multi-view video supported by the sink device 300 from the 3D video format support information. In this case, the media data determiner 430 may determine the number of views of multi-view video supported by the sink device 300 based on view number information of the multi-view video.

The display characteristic information extractor 420 may extract view order information indicating an order of views of the multi-view video, and the media data determiner 430 may determine a view order of the multi-view video supported by the sink device 300.

For example, the media data determiner 430 may extend views of original multi-view video based on the number of views of the multi-view video supported by the sink device 300. For example, the media data determiner 430 may generate video data having at least one other view by using per-view video data of original 3D video, form the video data in the multi-view video format supported by the sink device 300, and increase the number of views of the multi-view video.

For example, the source device 400 may not transmit 3D video data having a 3D video format not supported by the sink device 300 to the sink device 300 based on the 3D video format support information of the sink device 300, which has been received through the display characteristic data.

The display characteristic information extractor 420 may extract 3D video depth adjustment information for the sink device 300 from the 3D display characteristic information. The display characteristic information extractor 420 may extract at least one of information regarding a display size of the sink device 300 and information regarding a pixel interval size of the sink device 300 from the 3D video depth adjustment information.

For example, the media data determiner 430 may determine at least one of a display size and a pixel interval size of the sink device 300 based on the 3D video depth adjustment information. The media data determiner 430 may adjust depths of left-view video and right-view video of 3D video based on at least one of the display size and the pixel interval size of the sink device 300. The media data determiner 430 may transmit uncompressed 3D video data having changed depths or changed depth information to the sink device 300.

The display characteristic information extractor 420 may extract 3D video latency information of the sink device 300 from the 3D display characteristic information. The display characteristic information extractor 420 may extract at least one of 3D reconstruction delay information, 2D/3D video transform delay information, and view extension delay information from the 3D video latency information.

For example, the media data determiner 430 may determine a total latency time when 3D video is reproduced by the sink device 300, based on the 3D video latency information. The media data determiner 430 may determine an output time of other media data so that other media data to be reproduced together with the 3D video is synchronized with the 3D video, based on a determined reproduction time of the 3D video.

The display characteristic information extractor 420 may extract game mode support information of the sink device 300 from the display characteristic information. For example, if it is read based on the game mode support information that the sink device 300 supports the game mode, the source device 400 may transmit game mode change information directing a change to the game mode to the sink device 300 when game content media must be reproduced in the game mode by the sink device 300.

The display characteristic information extractor 420 may extract division screen display support information of the sink device 300 from the display characteristic information. The source device 400 may read that the sink device 300 has division screen display capability, based on the division screen display support information of the sink device 300.

For example, if the source device 400 and the sink device 300 are connected through a single display interface, the source device 400 may sequentially output a plurality of pieces of division video data to the sink device 300 through the single display interface according to division numbers of the division screen identification information. The source device 400 may transmit a single piece of division video data through the single display interface every time a vertical synchronization signal is generated and transmit division screen identification information of the division video data following the vertical synchronization signal.

The source device 400 may read that the sink device 300 has division screen display capability, based on the division screen display support information of the sink device 300.

For example, if the source device 400 and the sink device 300 are connected through a plurality of display interfaces, the source device 400 may transmit division screen identification information of division video data following a vertical synchronization signal to the sink device 300 through each of the plurality of display interfaces in synchronization with the vertical synchronization signal and transmit corresponding division video data at a vertical synchronization signal generation time.

The display characteristic information extractor 420 may extract 3D display characteristic information, which can be updated at an arbitrary time, from the 3D display characteristic information. The display characteristic information extractor 420 may extract user 3D usage information, which can be updated every time a user's usage pattern is changed based on at least one of a user's usage frequency and a user's current usage pattern, from the updatable 3D display characteristic information.

For example, the display characteristic information extractor 420 may extract at least one of information regarding a watching distance when a user watches 3D media, information regarding a watching age of the user watching the 3D media, and information regarding 3D glasses of the user, which are registered in the sink device 300, from the user 3D usage information.

For example, if the user 3D usage information is received at an arbitrary time and the user's usage pattern of the sink device 300 has been updated, the media data determiner 430 may re-determine uncompressed media data to be transmitted to the sink device 300 based on the updated user 3D usage information.

The source device 400 may receive display characteristic data through display interfaces, such as an HDMI, an IEEE 1394 interface, a DisplayPort interface, and a DVI.

For example, if the display characteristic data receiver 410 receives display characteristic data in the HDMI-based E-EDID data format, the display characteristic information extractor 420 may extract at least one of 3D display characteristic information and display characteristic information from at least one of a reserved data block and a user extension data block of E-EDID data.

The display characteristic information extractor 420 may extract at least one of 3D display characteristic information and display characteristic information from an extended data field of a vendor specific data block of the E-EDID data.

The source device 100 and the sink device 200 for transmitting and receiving media auxiliary information according to an exemplary embodiment have been described in detail with reference to FIGS. 1 and 2, and the sink device 300 and the source device 400 for transmitting and receiving display characteristic information according to an exemplary embodiment have been described in detail with reference to FIGS. 3 and 4.

According to another exemplary embodiment, the source device 400 may further include the components 110, 120, and 130 of the source device 100, or the source device 100 may further include the components 410, 420, and 430 of the source device 400. In this case, the source device 100 or 400 may transmit media data and media auxiliary data to the sink device 200 or 300 through a data transmission channel of a display interface. Also, the source device 100 or 400 may receive display characteristic information from the sink device 200 or 300 through a display characteristic information transmission channel of a display interface and select and transmit media data to the sink device 200 or 300 based on the display characteristic information.

Likewise, according to another exemplary embodiment, the sink device 200 may further include the components 310 and 320 of the sink device 300, or the sink device 300 may further include the components 210, 220, and 230 of the sink device 200. In this case, the sink device 200 or 300 may generate display characteristic data and transmit the display characteristic data to the source device 100 or 400 through a display characteristic information transmission channel of a display interface. Also, the sink device 200 or 300 may receive media data and media auxiliary data from the source device 100 or 400 through a data transmission channel of a display interface and restore the media data to media based on media reproduction information.

Figure 5:
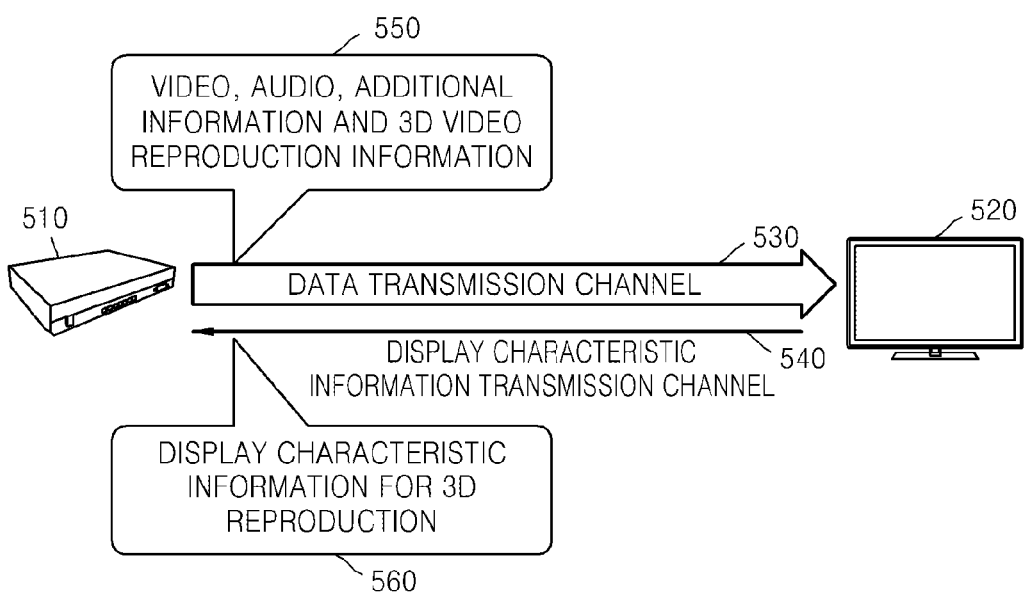
FIG. 5 illustrates a system in which a source device and a sink device according to an exemplary embodiment transmit and receive media auxiliary data and display characteristic data.

FIG. 5 illustrates a system in which a source device 510 and a sink device 520 according to an exemplary embodiment transmit and receive media auxiliary data and display characteristic data.

Referring to FIG. 5, the source device 510 and the sink device 520 may transmit and receive data through a display interface. The display interface may include a data transmission channel 530 and a display characteristic information transmission channel 540.

The source device 510 may be a set-top box, a DVR, and a video recorder. The sink device 520 may include a digital TV, a monitor, a display device with a 3D video receiver, and a 3D display device.

The source device 510 may transmit media related data 550 to the sink device 520 through the data transmission channel 530. The sink device 520 may receive the media related data 550 from the source device 510 through the data transmission channel 530.

The media related data 550 may include uncompressed media data, such as video data and audio data, and media auxiliary data including media reproduction information that is additional information of characteristics of media.

If transmitted video data is 3D video data, the media auxiliary data may further include 3D video reproduction information including various kinds of information regarding 3D video as information required for the sink device 520 to perform 3D reproduction of the 3D video data.

The sink device 520 may read the media reproduction information or the 3D video reproduction information of the received media auxiliary data. The sink device 520 may reproduce an image signal or a sound signal of the received uncompressed media data by using the media reproduction information or the 3D video reproduction information. The sink device 520 may transform the received uncompressed media data to uncompressed media data of a reproduction format reproducible by the sink device 520 and reproduce the transformed uncompressed media data.

The sink device 520 may transmit display characteristic data 560 to the source device 510 through the display characteristic information transmission channel 540. The source device 510 may receive the display characteristic data 560 from the sink device 520 through the display characteristic information transmission channel 540.

The display characteristic data 560 may include display characteristic information including information regarding video display capability of the sink device 520. The video display capability of the sink device 520 is a characteristic of functions of hardware and software and may include, for example, a resolution, a display size, a pixel interval size, a frame rate, a scanning scheme.

The display characteristic data 560 may further include 3D display characteristic information including information regarding 3D display capability of the sink device 520 required for the sink device 520 to perform 3D reproduction of 3D video and information regarding characteristics of 3D video data recognizable and reproducible by the sink device 520.

The source device 510 may read the display characteristic information or the 3D display characteristic information of the received display characteristic data 560. The source device 510 may selectively determine uncompressed media data of a format reproducible by the sink device 520 by using the display characteristic information or the 3D display characteristic information of the sink device 520 and transmit the determined uncompressed media data to the sink device 520.

The source device 510 may transform original uncompressed media data according to a format recognizable or reproducible by the sink device 520 based on the display characteristic information or the 3D display characteristic information. The source device 510 may transmit uncompressed media data of the transformed format to the sink device 520 through the data transmission channel 530.

Thus, the source device 510 may transmit media auxiliary data to the sink device 520 through the display interface and receive display characteristic information from the sink device 520. The source device 510 may include all of the components 110, 120, and 130 of the source device 100 and the components 410, 420, and 430 of the source device 400.

The sink device 520 may transmit display characteristic information to the source device 510 through the display interface and receive media auxiliary data from the source device 510 through the display interface. The sink device 520 may include all of the components 210, 220, and 230 of the sink device 200 and the components 310 and 320 of the sink device 300.

The display interface through which the source device 100, 400, or 510 and the sink device 200, 300, or 520 transmit and receive data may include display interfaces based on standards, such as an HDMI, an IEEE 1394 interface, a DisplayPort interface, and a DVI. For convenience of description, embodiments in which a display interface based on HDMI is representatively used are described in detail. However, the principle is not limited to operations through the display interface based on HDMI.

Hereinafter, a structure of InfoFrame that is a data format including additional information of media transmitted through an HDMI interface is described in detail with reference to FIGS. 6 to 9, and a structure of E-EDID that is a data format including information regarding display capability of a sink device is described in detail with reference to FIGS. 10 to 13.

FIG. 6 is an InfoFrame type table 600 based on CEA 861 standards.

According to the InfoFrame type table 600, the source device 100 or 510 may transmit additional information of media through an HDMI interface by using InfoFrames of an AVI InfoFrame type 610 and a vendor specific InfoFrame type 620.

The sink device 200 or 520 may read the additional information of the media by receiving the AVI InfoFrame according to the AVI InfoFrame type 610 or the vendor specific InfoFrame according to the vendor specific InfoFrame type 620.

FIG. 7 illustrates an InfoFrame format 700 of an AVI InfoFrame.

According to the InfoFrame format 700 of an AVI InfoFrame according to the AVI InfoFrame type 610, the source device 100 or 510 may insert color format information, such as an RGB format or a YCbCr format of video to be transmitted, into data bytes Y1 and Y0 of the AVI InfoFrame and transmit the video.

The source device 100 or 510 may transmit aspect ratio information of an Active format through data bytes R3, R2, R1, and R0 of the AVI InfoFrame, transmit scan information, such as overscan and underscan, through data bytes S1 and S0, transmit picture aspect ratio information through data bytes M1 and M0, transmit colorimetry information through data bytes C1 and C0, and transmit information regarding picture scaling through data bytes SC1 and SC0.

The sink device 200 or 520 may read the additional information of the media, such as the aspect ratio information of the Active format, the scan information, the picture aspect ratio information, the colorimetry information, and the picture scaling information, of the received uncompressed media by receiving AVI InfoFrame through the HDMI interface.

FIGS. 8 and 9 are structures of a packet header 800 and a packet content 900 of an HDMI-based vendor specific InfoFrame, respectively.

According to the structure of the InfoFrame of the vendor specific InfoFrame type 620, i.e., the packet header 800 and the packet content 900 of the vendor specific InfoFrame, the source device 100 or 510 may transmit the packet content 900 of the vendor specific InfoFrame, which includes vendor unique information in which a 24-bit IEEE registration identifier is set.

For example, the source device 100 or 510 may transmit information regarding a video format of uncompressed video data through a packet byte 'HDMI_Video_Format'. The source device 100 or 510 may transmit information regarding a 3D video format of uncompressed 3D video data, such as the side-by-side format, the top-and-bottom format, or the frame packing format, through a packet byte '3D Structure'.

The sink device 200 or 520 may read a video format of uncompressed video data from the packet content 900 by receiving the vendor specific InfoFrame. The sink device 200 or 520 may read from the vendor specific InfoFrame that the received uncompressed video data is uncompressed 3D video data of the side-by-side format, the top-and-bottom format, or the frame packing format.

Figure 10:
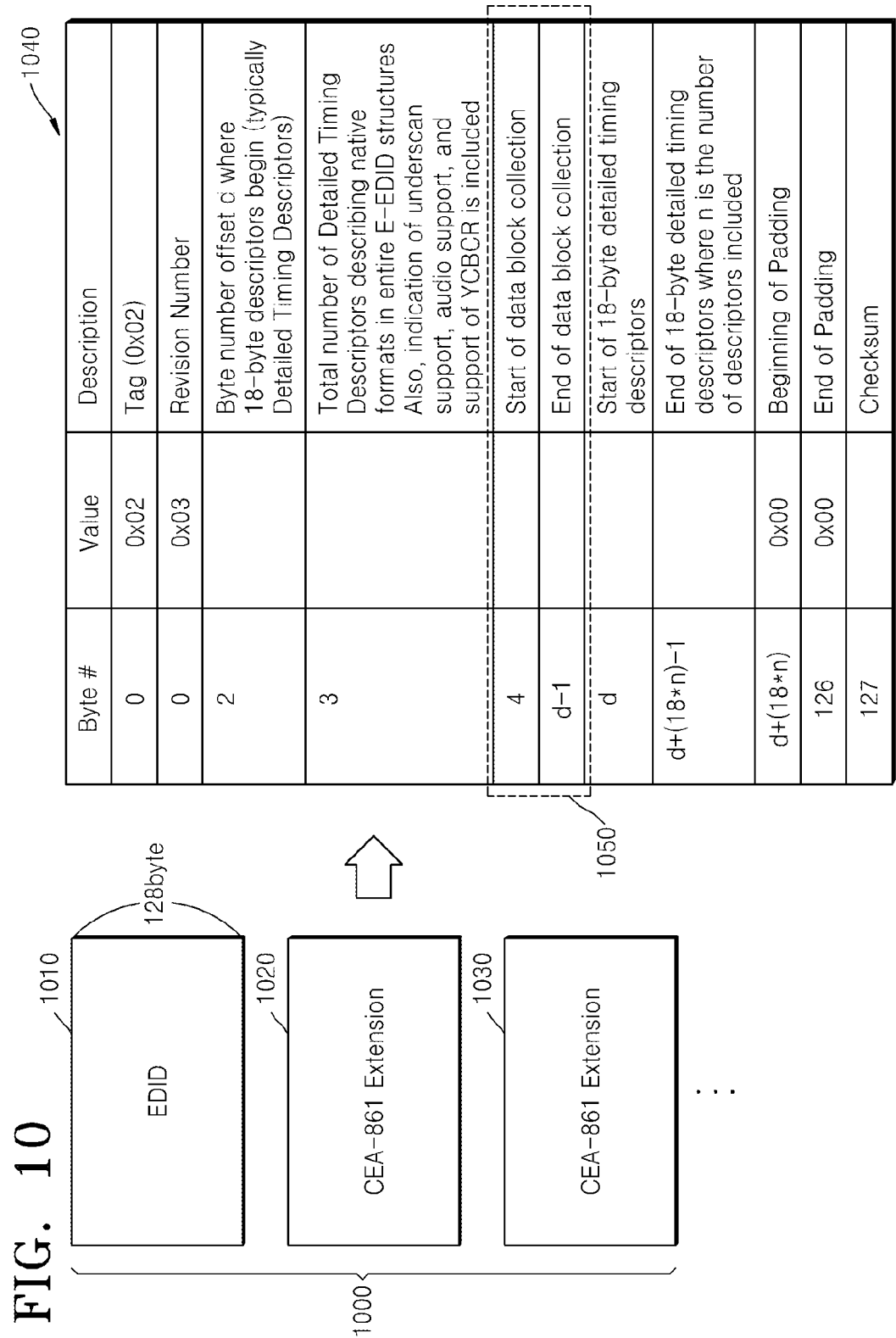
FIG. 10 shows a structure of Enhanced Extended Display Identification Data (E-EDID) and a table of CEA extension data.
Figure 13:
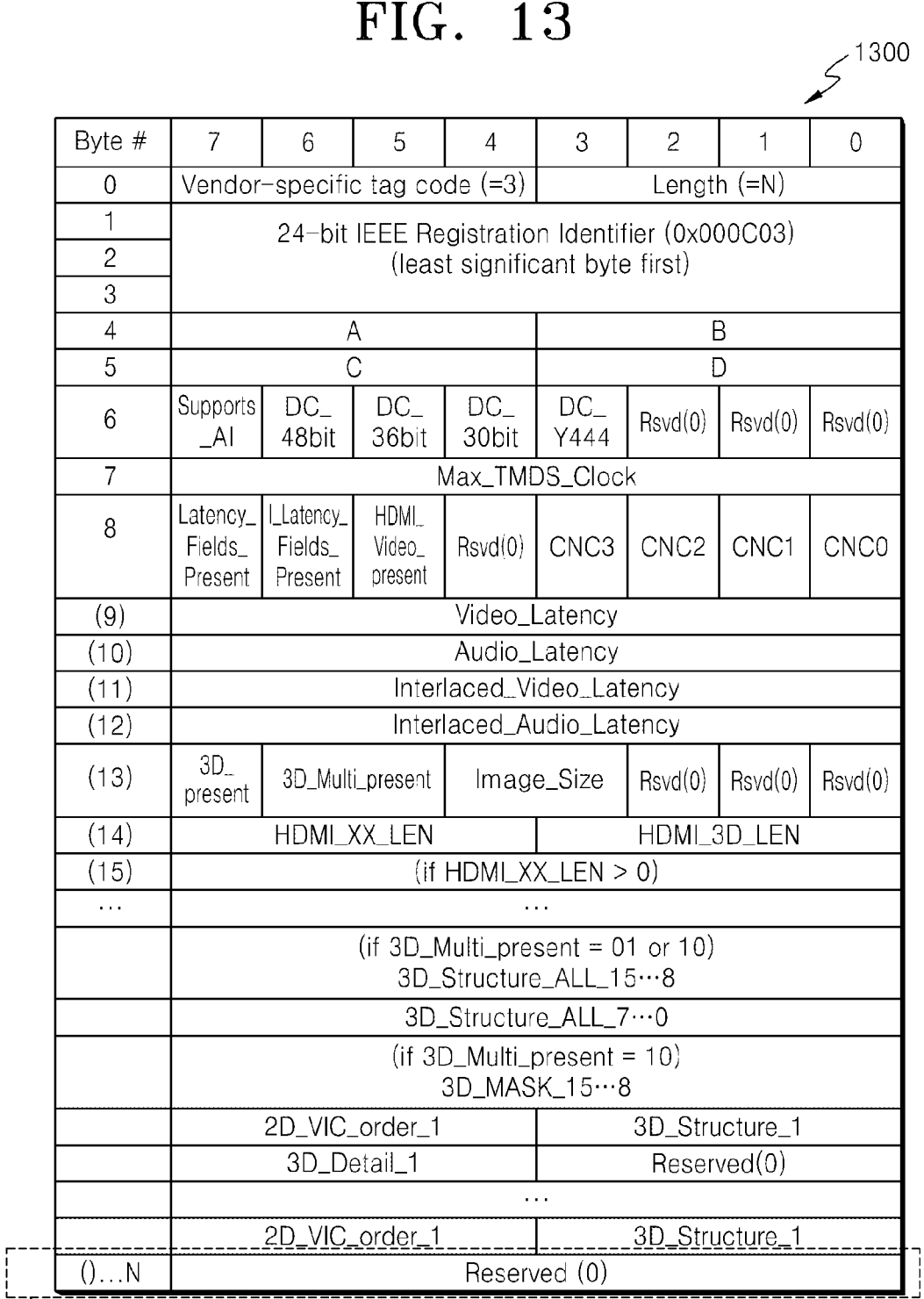
FIG. 13 shows an HDMI-based vendor specific data block extension structure.

FIG. 10 shows a structure of E-EDID data and a table of CEA extension data. FIGS. 11 and 12 show a table of data block types and a data block collection format, respectively. FIG. 13 shows an HDMI-based vendor specific data block extension structure.

HDMI-based E-EDID data 1000 has a structure in which one or more CEA extension data 1020 and 1030 are added to HDMI-based EDID data 1010. Each of the EDID data 1010 and the CEA extension data 1020 and 1030 has a data structure of 128 bytes. The CEA extension data 1020 and 1030 may be formed according to a CEA 861-based EDID extension data format 1040 shown in FIG. 10.

A data block collection 1050 of the EDID extension data format 1040 may be formed according to a CEA data block collection format 1200 shown in FIG. 12. According to a data block type table 1100 shown in FIG. 11, the CEA extension data 1020 and 1030 may include an audio data block, a video data block, and a vendor specific data block.

The sink device 300 or 520 may insert information regarding a media format supported by the sink device 300 or 520 into the data block collection 1050 of the CEA extension data 1020 and 1030 of the E-EDID data 1000.

A vendor specific data block 1130 of the CEA extension data 1020 and 1030 in the data block type table 1100 may be formed according to a vendor specific data block format 1210. The vendor specific data block format 1210 may be extended according to a vendor specific data block extension 1300 shown in FIG. 13.

That is, the sink device 300 or 520 may insert information regarding display capability of audio and video recognizable and reproducible by the sink device 300 or 520 into the audio data block and the video data block of the CEA extension data 1020 and 1030 of the E-EDID data 1000 and transmit the E-EDID data 1000 to the source device 400 or 510 through the HDMI interface.

The source device 400 or 510 may receive the E-EDID data 1000 through the HDMI interface and read the information regarding display capability of audio and video supported by the sink device 300 or 520 from the audio data block and the video data block of the CEA extension data 1020 and 1030 of the E-EDID data 1000.

The source device 400 or 510 and the sink device 300 or 520 may transmit and receive 3D video reproduction information and media reproduction information defined according to an exemplary embodiment through an HDMI-based display interface.

The source device 100 or 510 and the sink device 200 or 520 may insert 3D video reproduction information and media reproduction information into media auxiliary data of an InfoFrame format and transmit and receive an InfoFrame through an HDMI-based display interface.

In this case, the source device 100 or 510 and the sink device 200 or 520 may transmit and receive 3D video reproduction information and media reproduction information by extending a data field of the AVI InfoFrame type 610 in the CEA 861-based InfoFrame type table 600.

The source device 100 or 510 and the sink device 200 or 520 may transmit and receive 3D video reproduction information and media reproduction information by using reserved packet bytes of the vendor specific InfoFrame type 620 in the CEA 861-based InfoFrame type table 600.

The source device 100 or 510 and the sink device 200 or 520 may transmit and receive 3D video reproduction information and media reproduction information by using reserved packet bytes of a reserved InfoFrame type 630 in the CEA 861-based InfoFrame type table 600.

The source device 400 or 510 and the sink device 300 or 520 may transmit and receive 3D display characteristic information and display characteristic information of the sink device 300 or 520, which are defined according to an exemplary embodiment, through an HDMI-based display interface.

The source device 400 or 510 and the sink device 300 or 520 may insert 3D display characteristic information and display characteristic information of the sink device 300 or 520, which are defined according to an exemplary embodiment, into E-EDID data and transmit and receive the E-EDID data through an HDMI-based display interface.

In this case, the source device 400 or 510 and the sink device 300 or 520 may transmit and receive 3D display characteristic information and display characteristic information of the sink device 300 or 520, which are defined according to an exemplary embodiment, by using a reserved data block 1110 and a user extension data block 1120 of the CEA extension data 1020 and 1030 of the E-EDID data 1000.

The source device 400 or 510 and the sink device 300 or 520 may transmit and receive 3D display characteristic information and display characteristic information of the sink device 300 or 520, which are defined according to an exemplary embodiment, by using a reserved field 1310 of the vendor specific data block extension 1300 that is an extended pattern of the vendor specific data block format 1210 of the E-EDID data 1000.

Hereinafter, embodiments in which media auxiliary data according to an exemplary embodiment and display characteristic data according to an exemplary embodiment are applied to an HDMI-based display interface are described in detail with reference to FIGS. 14 to 36.

First, media auxiliary information according to an exemplary embodiment and display characteristic information according to an exemplary embodiment are described in detail with reference to FIGS. 14 to 28.

The media auxiliary data may be transmitted from the source device 510 to the sink device 520 through the data transmission channel 530 of the display interface. The media auxiliary information may be inserted into the media auxiliary data.

The display characteristic data may be transmitted from the sink device 520 to the source device 510 through the display characteristic information transmission channel 540 of the display interface. The display characteristic information may be transmitted and received through the display characteristic data.

Figure 14:
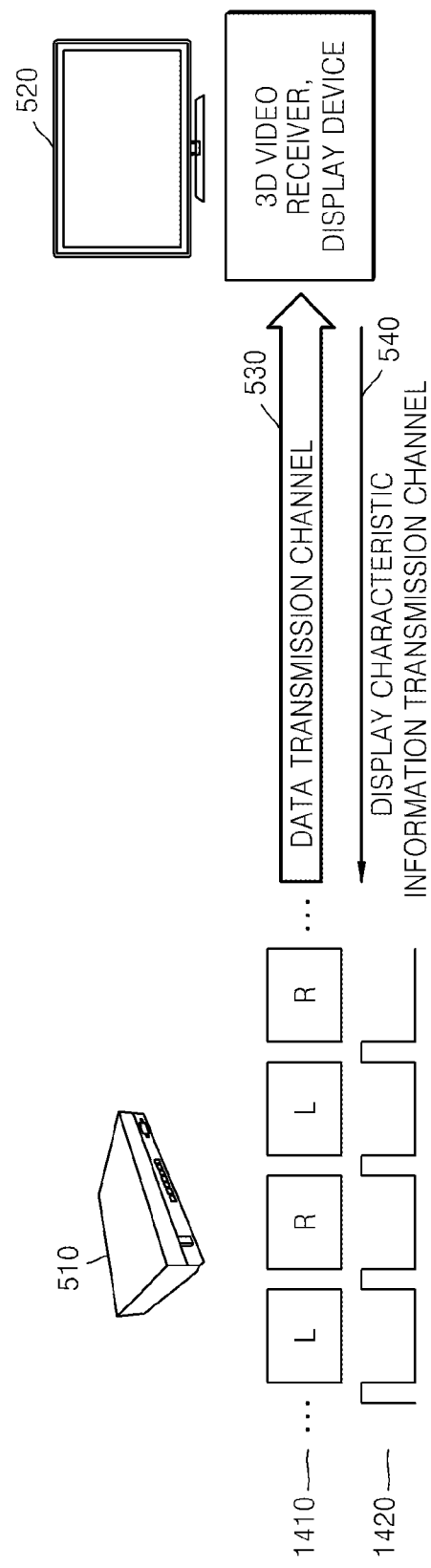
FIG. 14 shows an illustration in which a source device and a sink device according to an exemplary embodiment transmit and receive 3D video transfer format providing information and 3D video format support information through a display interface.

FIG. 14 shows a case in which the source device 510 and the sink device 520 transmit and receive 3D video transfer format providing information and 3D video format support information through a display interface.

Referring to FIG. 14, the source device 510 may transmit uncompressed video data 1410 of the frame/field sequential format to the sink device 520 through the data transmission channel 530 of the display interface.

The source device 510 may continuously transmit any of left-view frames and right-view frames (or left-view fields and right-view fields) of the uncompressed video data 1410 of the frame/field sequential format in every vertical screen interval by being synchronized with a periodically generated vertical synchronization signal 1420.

The source device 510 may alternately transmit the left-view frames (fields) and the right-view frames (fields) of the uncompressed video data 1410 of the frame/field sequential format.

The source device 510 may transmit 3D video transfer format providing information, which indicates that a 3D video transfer format of 3D video data to be transmitted by the source device 510 is the frame/field sequential format, to the sink device 520 through the data transmission channel 530 of the display interface.

The sink device 520 may receive the 3D video transfer format providing information from the source device 510 through the data transmission channel 530 of the display interface and read that a 3D video transfer format of currently received 3D video data is the frame/field sequential format. The sink device 520 may determine a left-view frame (field) and a right-view frame (field) of the 3D video data received through the data transmission channel 530 of the display interface and perform 3D reproduction of the 3D video data.

The sink device 520 may transmit 3D video format support information, which indicates that the sink device 520 can recognize a 3D video transfer format of the frame/field sequential format, through the display characteristic information transmission channel 540 of the display interface.

The source device 510 may receive the 3D video format support information from the sink device 520 through the display characteristic information transmission channel 540 of the display interface and read that the sink device 520 can receive and recognize or reproduce uncompressed video data of the frame/field sequential format.

The source device 510 may transmit uncompressed 3D video data of the frame/field sequential format to the sink device 520 through the data transmission channel 530 of the display interface based on a result of reading the 3D video format support information.

Figure 15:
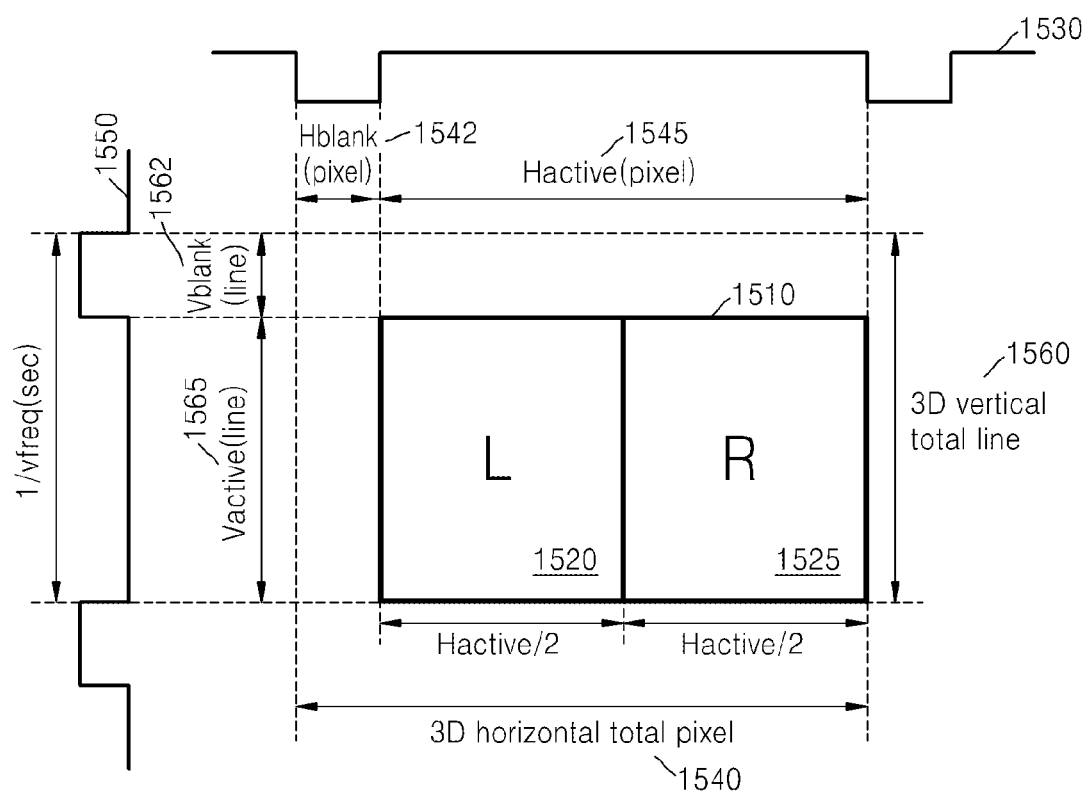
FIGS. 15 and 16 show structures of transmitting 3D video data of a side-by-side format and a frame packing format through a display interface, respectively.
Figure 16:
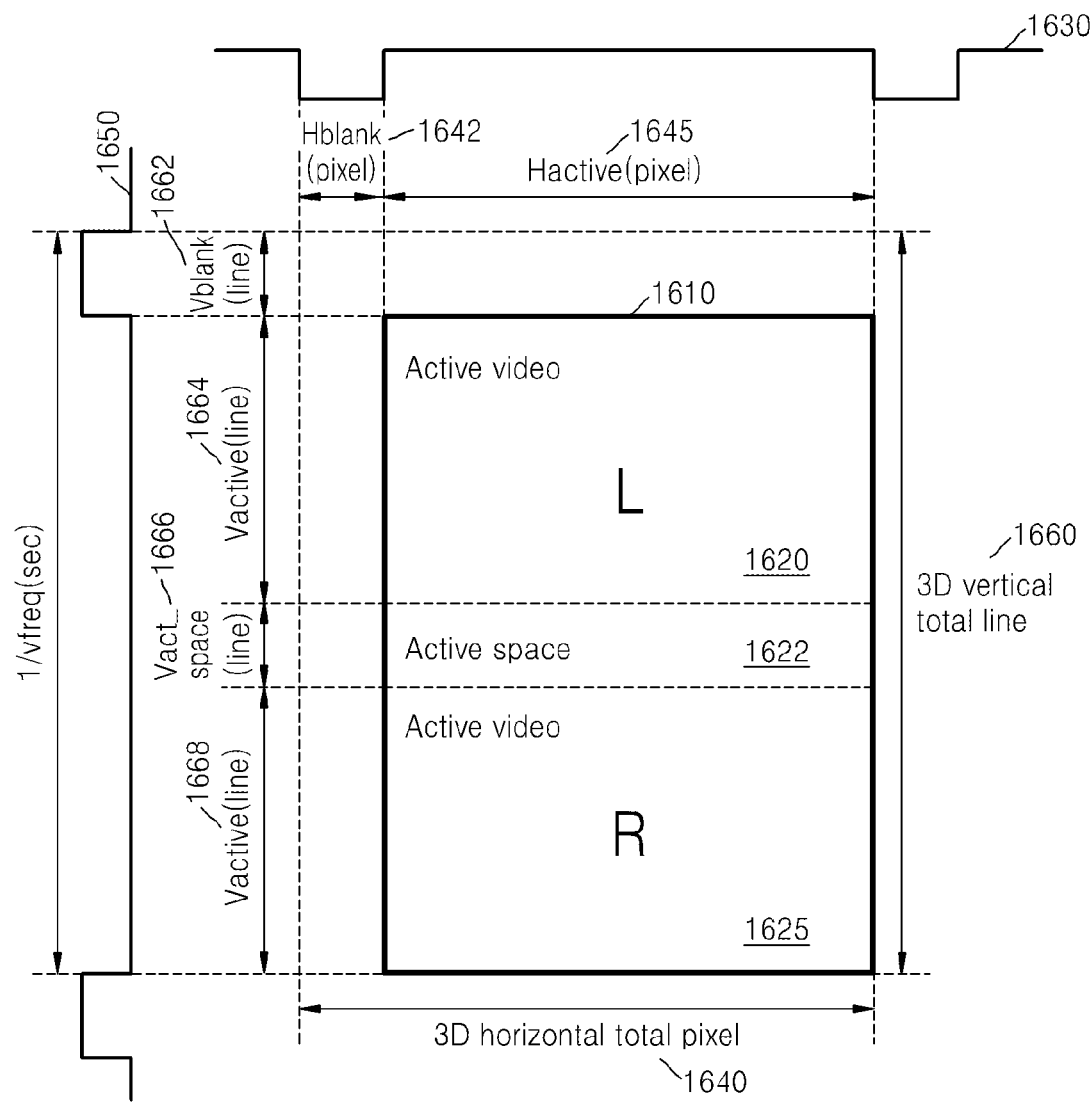

FIGS. 15 and 16 show structures of transmitting 3D video data of the side-by-side format and the frame packing format through a display interface, respectively.

According to the side-by-side format shown in FIG. 15, 3D video data 1510 of a single frame in which a left-view video area 1520 and a right-view video area 1525 are arranged side by side is transmitted in a single data transfer period.

3D horizontal total pixels 1540 may be transmitted in a horizontal signal interval 1530 of one period, and 3D vertical total pixels 1560 may be transmitted in a vertical signal interval 1550 of one period.

No 3D video data is transmitted in a blank horizontal signal interval 1542 of the horizontal signal interval 1530 and in a blank vertical signal interval 1562 of the vertical signal interval 1550. The 3D video data 1510 of the side-by-side format is transmitted frame by frame in a horizontal active signal interval 1545 of the horizontal signal interval 1530 and in a vertical active signal interval 1565 of the vertical signal interval 1550.

According to the frame packing format shown in FIG. 16, a left-view frame and a right-view frame are sequentially transmitted in a single data transfer period. In particular, 3D video data 1610 of a single frame in which an active video area 1620 of the left-view frame, an active space area 1622, and an active video area 1625 of the right-view frame are sequentially transmitted is transmitted in a single data transfer period.

Although 3D horizontal total pixels 1640 can be transmitted in a horizontal signal interval 1630 of one period and 3D vertical total pixels 1660 can be transmitted in a vertical signal interval 1650 of one period, no 3D video data is transmitted in a blank horizontal signal interval 1642 and in a blank vertical signal interval 1662. The 3D video data 1610 of a single frame according to the frame packing format is transmitted in a horizontal active signal interval 1645 of the horizontal signal interval 1630 of one period.

In the vertical signal interval 1650 of one period, the active video area 1620 of the left-view frame is transmitted in a first vertical active signal interval 1664, the active space area 1622 is transmitted in a vertical active space interval 1666, and the active video area 1625 of the right-view frame is transmitted in a second vertical active signal interval 1668.

Figure 17:
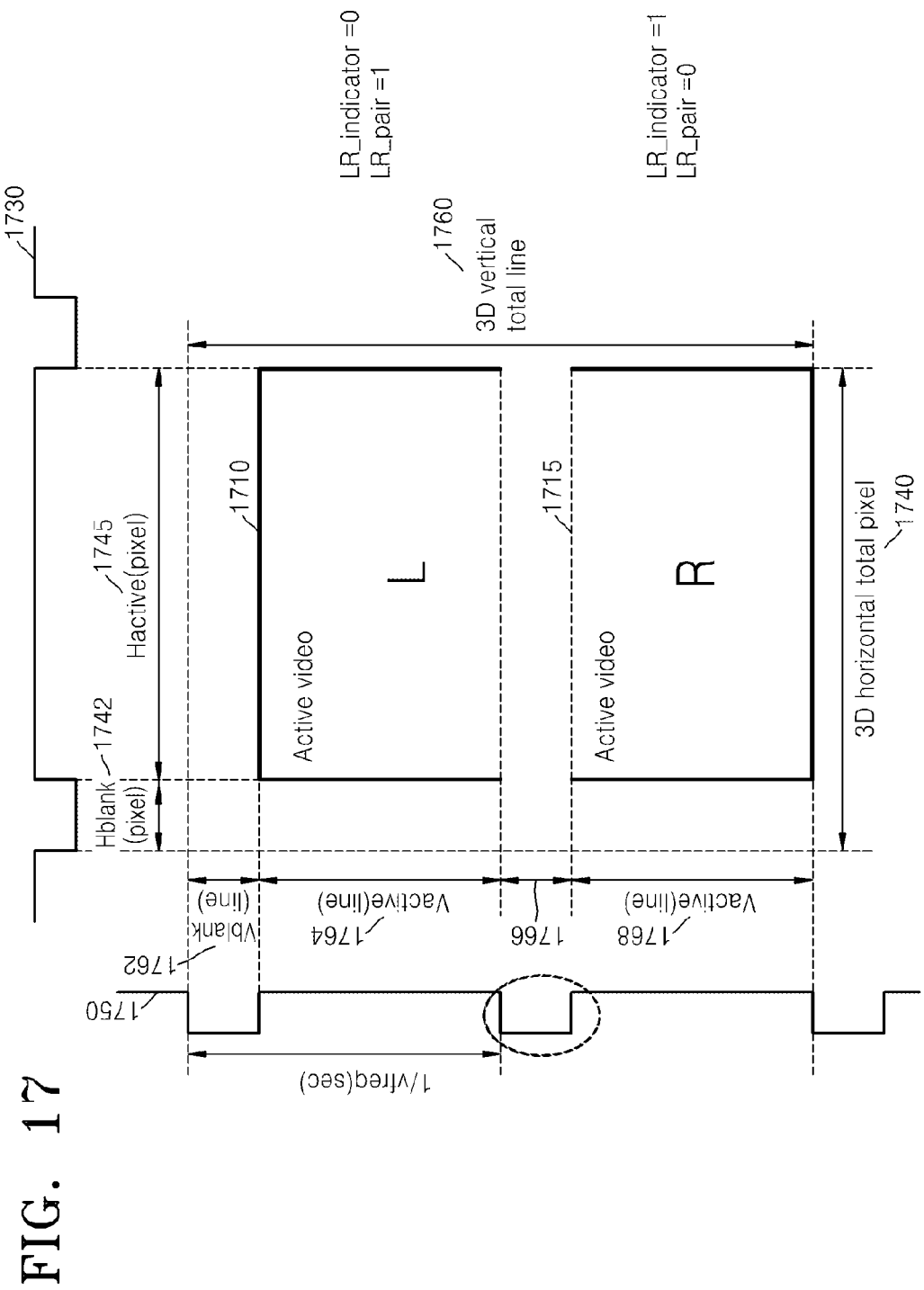
FIG. 17 shows a structure of transmitting 3D video data of a frame/field sequential format through a display interface, according to an exemplary embodiment.

FIG. 17 shows a structure of transmitting 3D video data of the frame/field sequential format through a display interface, according to an exemplary embodiment.

According to the frame/field sequential format shown in FIG. 17, a left-view frame or a right-view frame is transmitted in a single data transfer period, wherein every left-view frame and right-view frame may be alternately transmitted by repeating the data transfer period.

An active video area 1710 of the left-view frame may be transmitted in a first data transfer period, and an active video area 1715 of the right-view frame may be transmitted in a second data transfer period. The active video area 1710 of the left-view frame and the active video area 1715 of the right-view frame may be alternately and sequentially transmitted by repeating the data transfer period.

Although 3D horizontal total pixels 1740 can be transmitted in a horizontal signal interval 1730 of one period and 3D vertical total pixels 1760 can be transmitted in a vertical signal interval 1750 of one period, no 3D video data is transmitted in a blank horizontal signal interval 1742 and in blank vertical signal intervals 1762 and 1766. That is, no data is transmitted even between the active video area 1710 of the left-view frame and the active video area 1715 of the right-view frame because of the presence of the blank vertical signal interval 1766.

The source device 510 and the sink device 520 may transmit and receive the active video area 1710 of the left-view frame and the active video area 1715 of the right-view frame according to the frame/field sequential format in a horizontal active signal interval 1745 of the horizontal signal interval 1730 of one period.

Thus, the source device 510 and the sink device 520 may transmit and receive the active video area 1710 of the left-view frame in a first vertical active signal interval 1764 of the vertical signal interval 1750 of a first period and the active video area 1715 of the right-view frame in a second vertical active signal interval 1768 of the vertical signal interval 1750 of a second period for the vertical signal interval 1750 of two periods.

Accordingly, according to the frame/field sequential format, a pair of left-view frame and right-view frame may be separated and transmitted for a vertical signal interval of two periods. Every left-view frame and right-view frame may be alternately transmitted by repeating a data transfer period.

In addition, when the source device 100 or 510 transmits 3D video data of the frame/field sequential format, the source device 100 or 510 may determine left/right identification information and left/right order information as 3D video reproduction information.

As shown in FIG. 17, when the active video area 1710 of the left-view frame is transmitted in a vertical signal interval of a first period and the active video area 1715 of the right-view frame is transmitted in a vertical signal interval of a second period, left/right identification information and left/right order information may be determined as described below.

The source device 100 or 510 may determine left/right identification information regarding the active video area 1710 of the left-view frame so that the left/right identification information indicates a left-view frame. That is, a value of the left/right identification information 'LR_indicator' may be set to '0'. In addition, the source device 100 or 510 may determine left/right order information so that a current frame is first transmitted from among a pair of left-view frame and right-view frame. That is, a value of the left/right order information 'LR_pair' may be set to '1'.

Similarly, the value of the left/right identification information 'LR_indicator' may be set to '1' by determining the left/right identification information regarding the active video area 1715 of the right-view frame to indicate a right-view frame. In addition, the left/right order information may be set so that a current frame is last transmitted among a pair of left-view frame and right-view frame. That is, the value of the left/right order information 'LR_pair' may be set to '0'.

The sink device 520 may receive left/right order information and left/right identification information from the source device 510 through a display interface and read whether each of frames of currently received 3D video data of the frame/field sequential format is a left-view frame or a right-view frame.

Figure 18:
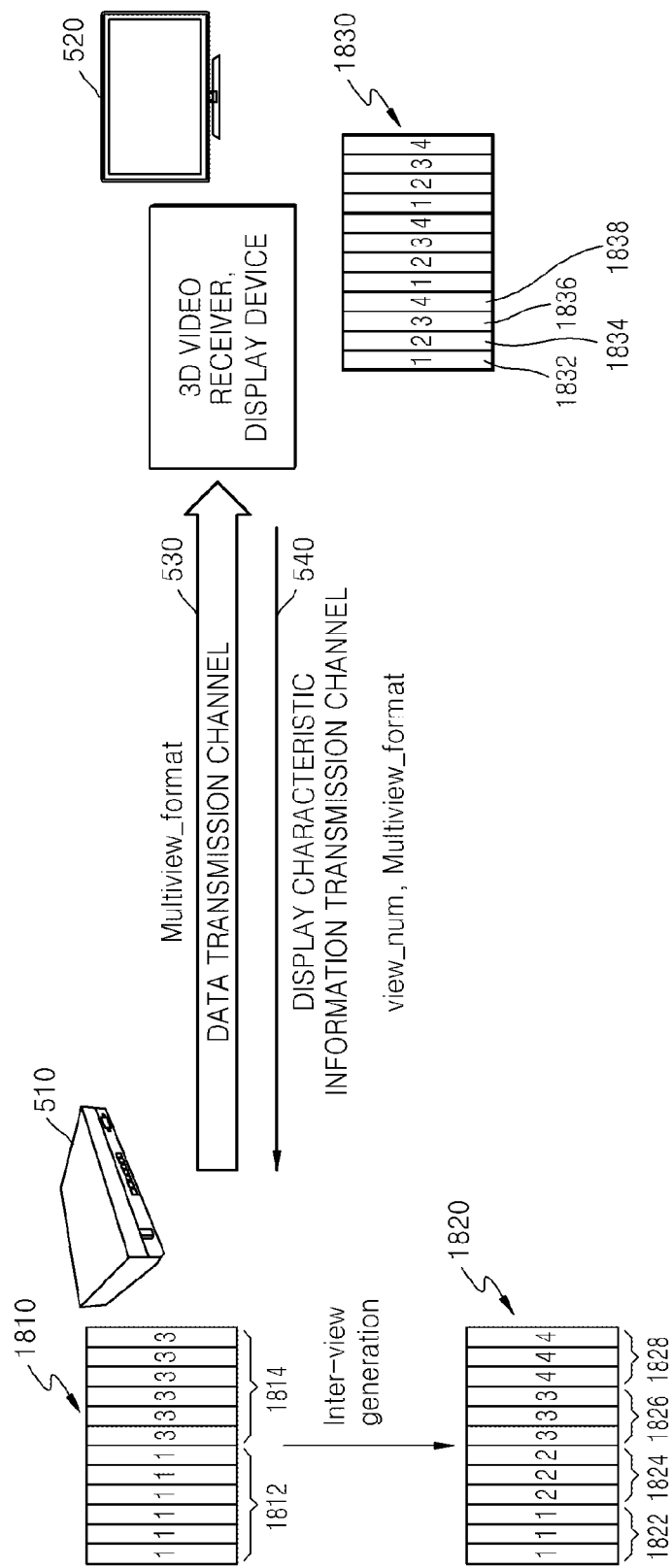
FIG. 18 shows an illustration in which a source device and a sink device according to an exemplary embodiment transmit and receive 3D video transfer format providing information and 3D video format support information through a display interface.

FIG. 18 shows an illustration in which the source device 510 and the sink device 520 according to an exemplary embodiment transmit and receive 3D video transfer format providing information and 3D video format support information through a display interface.

The source device 510 may transmit uncompressed video data of the multi-view video format to the sink device 520 through the data transmission channel 530 of the display interface.

The source device 510 may transmit uncompressed video data of various types of the multi-view video format. A type of the multi-view video format may be determined according to an order by which per-view data is arranged.

For example, uncompressed video data of a first multi-view video format 1810 may be transmitted in a form in which a first view video area 1812 and a third view video area 1814 are arranged side by side.

For example, uncompressed video data of a second multi-view video format 1820 may be transmitted in a form in which a first view video area 1822, a second view video area 1824, a third view video area 1826, and a fourth view video area 1828 are arranged side by side.

The source device 510 may transmit 3D video transfer format providing information, which indicates that a 3D video transfer format of 3D video data to be transmitted by the source device 510 is the multi-view video format, to the sink device 520 through the data transmission channel 530 of the display interface.

The sink device 520 may receive the 3D video transfer format providing information from the source device 510 through the data transmission channel 530 of the display interface and read that a 3D video transfer format of currently received 3D video data is the multi-view video format. The sink device 520 may perform 3D reproduction of per-view data of the 3D video data received through the data transmission channel 530 of the display interface.

When the sink device 520 can reproduce video of a reproduction format according to a third multi-view video format 1830, the sink device 520 may transform the per-view data of the received 3D video data to video data of the third multi-view video format 1830 and reproduce the transformed video data.

The sink device 520 may transmit 3D video format support information, which indicates that the sink device 520 can recognize a 3D video transfer format of the multi-view video format, through the display characteristic information transmission channel 540 of the display interface.

The sink device 520 may also transmit view number information indicating the number of views of the multi-view video format, which can be recognized and reproduced by the sink device 520, through the display characteristic information transmission channel 540 of the display interface.

The sink device 520 may also transmit view order information, which indicates an order of vertical lines of per-view video in the multi-view video format recognizable and reproducible by the sink device 520, through the display characteristic information transmission channel 540 of the display interface.

The source device 510 may receive the 3D video format support information from the sink device 520 through the display characteristic information transmission channel 540 of the display interface and read that the sink device 520 can receive and reproduce uncompressed video data of the multi-view video format.

The source device 510 may receive the view number information from the sink device 520 through the display characteristic information transmission channel 540 of the display interface and read the number of views of the multi-view video format, which can be recognized and reproduced by the sink device 520.

The source device 510 may receive the view order information from the sink device 520 through the display characteristic information transmission channel 540 of the display interface and read the order of per-view video in the multi-view video format recognizable and reproducible by the sink device 520.

The source device 510 may determine uncompressed 3D video data of the multi-view video format supported by the sink device 520 based on a result of reading the 3D video format support information, the view number information, and the view order information received from the sink device 520. The source device 510 may transmit the determined uncompressed 3D video data of the multi-view video format to the sink device 520 through the data transmission channel 530 of the display interface.

The 3D video format support information transmitted from the sink device 520 may indicate a type of the multi-view video format. For example, the third multi-view video format 1830 supported by the sink device 520 may has a pattern in which pixels of vertical lines 1832, 1834, 1836, and 1838 of per-view video are alternately arranged. The sink device 520 may transmit 3D video format support information indicating that the sink device 520 supports the third multi-view video format 1830, view number information indicating that the sink device 520 supports a multi-view video format having four views, and view order information indicating an order of vertical lines of per-view video to the source device 510.

For example, the source device 510 may receive the 3D video format support information, the view number information, and the view order information from the sink device 520 through the display interface and read that the sink device 520 supports 3D video of a reproduction format according to the third multi-view video format 1830 having four views.

Accordingly, the source device 510 may select and transmit uncompressed 3D video data of a transfer format according to the third multi-view video format 1830 having four views to the sink device 520.

The source device 510 may generate and transmit uncompressed 3D video data of the multi-view video format supported by the sink device 520. For example, if current 3D video data has the first multi-view video format 1810 having two views, the source device 510 may generate the second multi-view video format 1820 having four views by performing an inter-view generation process of the current 3D video data.

If the source device 510 selects and transmits uncompressed 3D video data of a transfer format according to the second multi-view video format 1820, the sink device 520 may receive the uncompressed 3D video data, transform the uncompressed 3D video data to 3D video data of a reproduction format according to the third multi-view video format 1830, and perform 3D reproduction of the transformed 3D video data.

The source device 510 may generate 3D video data of a transfer format according to the third multi-view video format 1830 by rearranging the order of vertical lines of per-view video data of the second multi-view video format 1820 and transmit the generated 3D video data to the sink device 520.

Accordingly, uncompressed 3D video data of the third multi-view video format 1830 supported by the sink device 520 may be provided from the source device 510 to the sink device 520. The source device 510 may re-set 3D video transfer format providing information indicating transmission of 3D video data of the third multi-view video format 1830 and transmit the re-set 3D video transfer format providing information to the sink device 520 through the data transmission channel 530.

Figure 19:
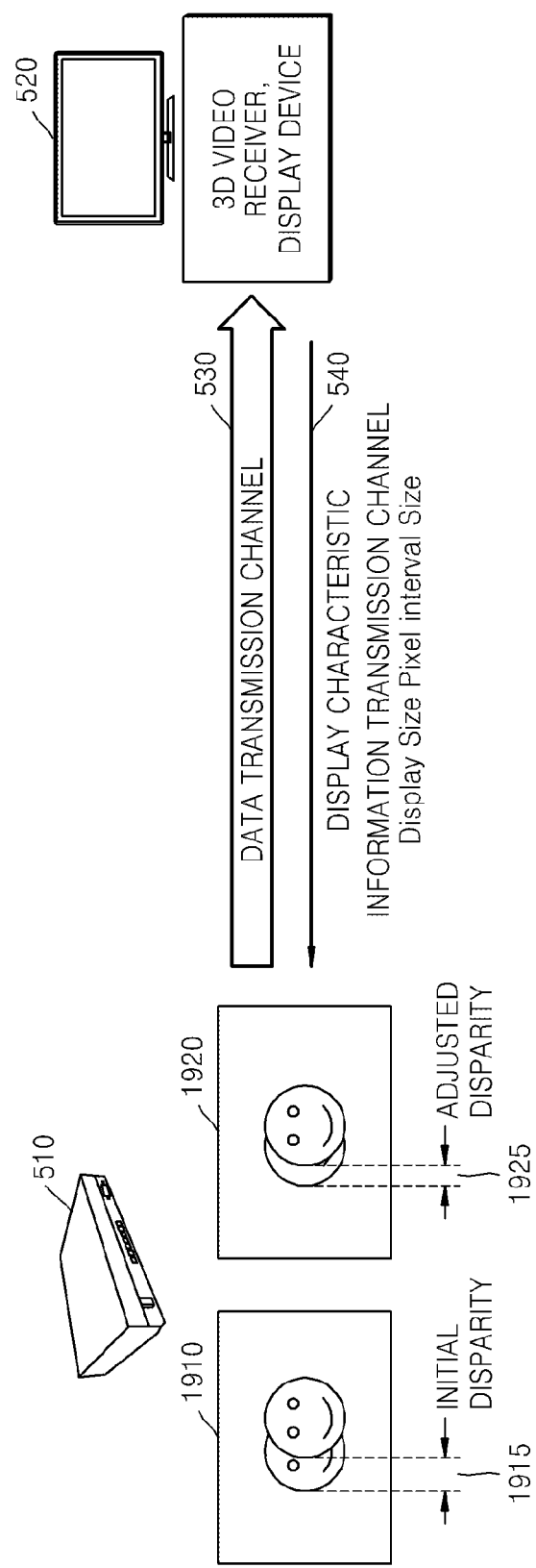
FIG. 19 shows an illustration in which a source device and a sink device according to an exemplary embodiment transmit and receive 3D video depth adjustment information through a display interface.

FIG. 19 shows a case in which the source device 510 and the sink device 520 according to an exemplary embodiment transmit and receive 3D video depth adjustment information through a display interface.

The sink device 520 may transmit 3D video depth adjustment information of the sink device 520 through the display characteristic information transmission channel 540 of the display interface.

The sink device 520 may transmit at least one of display size information and pixel interval size information of the sink device 520 as the 3D video depth adjustment information.

The source device 510 may receive the 3D video depth adjustment information from the sink device 520 through the display characteristic information transmission channel 540 of the display interface and read at least one of a display size and a pixel interval size of the sink device 520.

The source device 510 may determine a depth or disparity 1925 suitable for a video screen 1920 reproduced by the sink device 520 based on a result of reading at least one of the display size and the pixel interval size of the 3D video depth adjustment information received from the sink device 520.

The source device 510 may transform 2D video data to 3D video data based on the determined depth or disparity 1925 and transmit the transformed 3D video data to the sink device 520 through the data transmission channel 530 of the display interface.

The source device 510 may transmit depth information by adjusting an initial disparity 1915 of an original 3D video screen 1910 to the depth or disparity 1925 suitable for the sink device 520 to reproduce.

The source device 510 may generate uncompressed 3D video data having the depth or disparity 1925 suitable for the sink device 520 to reproduce and transmit the generated uncompressed 3D video data to the sink device 520 through the data transmission channel 530 of the display interface.

Figure 20:
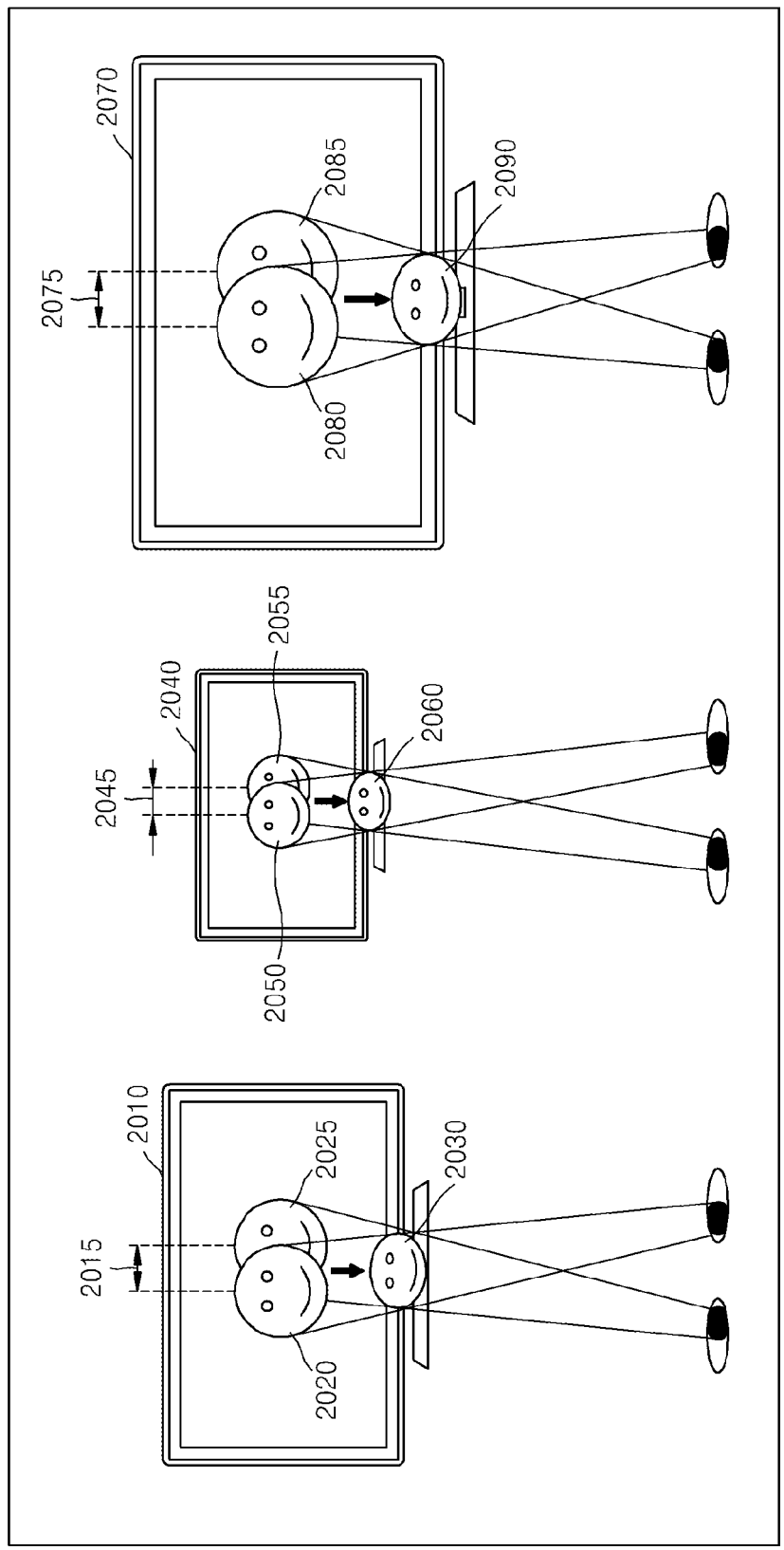
FIG. 20 shows a cubic effect varying according to a display size or a pixel interval size.

FIG. 20 shows a cubic effect varying according to a display size or a pixel interval size.

Referring to FIG. 20, each of a first sink device 2010, a second sink device 2040, and a third sink device 2070 reproduces the same 3D content having a predetermined depth.

Compared with the first sink device 2010, the second sink device 2040 has a less display size or pixel interval size, and the third sink device 2070 has a greater display size or pixel interval size.

Since the display sizes or pixel interval sizes of the first sink device 2010, the second sink device 2040, and the third sink device 2070 may differ from each other, cubic effects 2030, 2060, and 2090 according to 3D reproduction, which occur on screens of the first sink device 2010, the second sink device 2040, and the third sink device 2070, may differ from each other.

This is because a first distance 2015 actually shown between a left-view object 2025 and a right-view object 2020 on an actual 3D reproduction screen of the first sink device 2010, a second distance 2045 actually shown between a left-view object 2055 and a right-view object 2050 on an actual 3D reproduction screen of the second sink device 2040, and a third distance 2075 actually shown between a left-view object 2085 and a right-view object 2080 on an actual 3D reproduction screen of the third sink device 2070 differ from each other.

That is, if a display size or pixel interval size is large, the third distance 2075 between the left-view object 2085 and the right-view object 2080 is far, so the cubic effect 2090 actually felt by a user is great.

In addition, if a display size or pixel interval size is small, the second distance 2045 between the left-view object 2055 and the right-view object 2050 is near, so the cubic effect 2060 actually felt by the user is small.

Thus, the sink device 520 may transmit information regarding a display size or pixel interval size of the sink device 520 to the source device 510 through the display interface. The source device 510 may determine a disparity suitable for the sink device 520 based on the display size or pixel interval size of the sink device 520 and transmit optimal disparity information of the sink device 520, 3D video data adjusted to the optimal disparity of the sink device 520, or adjusted depth information to the sink device 520 through the display interface.

FIG. 21 shows an HDMI-based EDID data format.

The source device 510 may acquire the information regarding the display size or pixel interval size of the sink device 520 from an HDMI-based EDID data format 2120.

If E-EDID data is received from the sink device 520, the source device 510 may read information regarding a maximum horizontal image size and information regarding a maximum vertical image size of the sink device 520 from a data block 2110 of EDID data of the E-EDID data.

The source device 510 may determine a disparity suitable for the sink device 520 based on the maximum horizontal image size and the maximum vertical image size read from the data block 2110 of the EDID data. The source device 510 may transmit optimal disparity information of the sink device 520 or 3D video data adjusted to an optimal disparity of the sink device 520 to the sink device 520 through the display interface.

Figure 22:
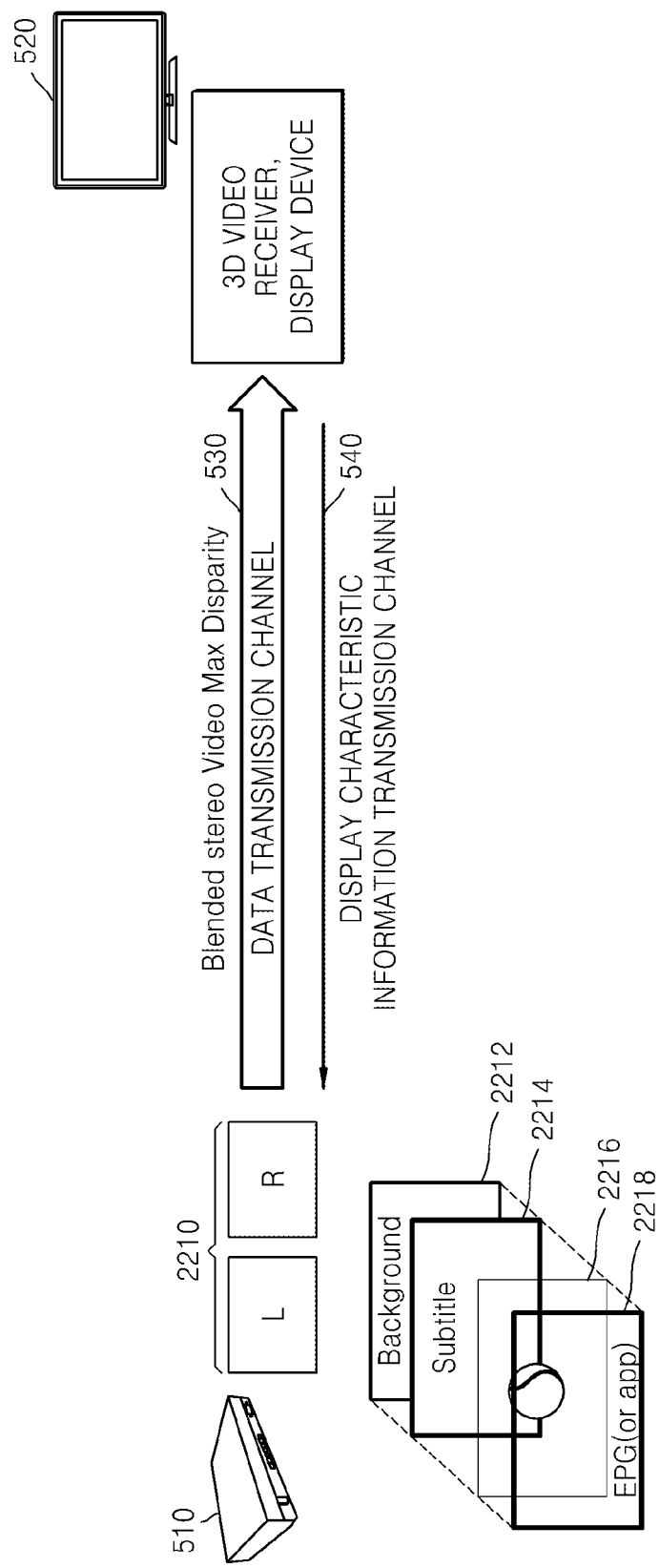
FIG. 22 shows a case in which a source device and a sink device according to an exemplary embodiment transmit and receive 3D video screen maximum disparity information through a display interface.

FIG. 22 shows a case in which the source device 510 and the sink device 520 according to an exemplary embodiment transmit and receive 3D video screen maximum disparity information through a display interface.

Referring to FIG. 22, the source device 510 may transmit 3D video screen maximum disparity information to the sink device 520 through the display interface.

The sink device 520 may receive the 3D video screen maximum disparity information from the source device 510 through the data transmission channel of the display interface and read the maximum disparity of a 3D video screen obtained by performing 3D reproduction of currently received 3D video data 2210.

The source device 510 may also form a 3D video screen in which video data, application data, and subtitle data provided by the source device 510 are synthesized. For example, the 3D video screen may be formed by synthesizing with their own depths a background plane 2212, a subtitle plane 2214, a video object plane 2216, and an EPG (or application) plane 2218 on which the video data, the application data, and the subtitle data provided by the source device 510 are displayed.

The sink device 520 may additionally reproduce application data unique to the sink device 520 or OSD data on a 3D video screen.

Thus, in order for the sink device 520 to additionally reproduce data of the sink device 520 on a 3D video screen provided by the source device 510, the sink device 520 may reproduce a display plane on which application data unique to the sink device 520 or OSD data is displayed so that the display plane has a disparity greater than the maximum disparity of the 3D video screen provided by the source device 510.

Figure 23:
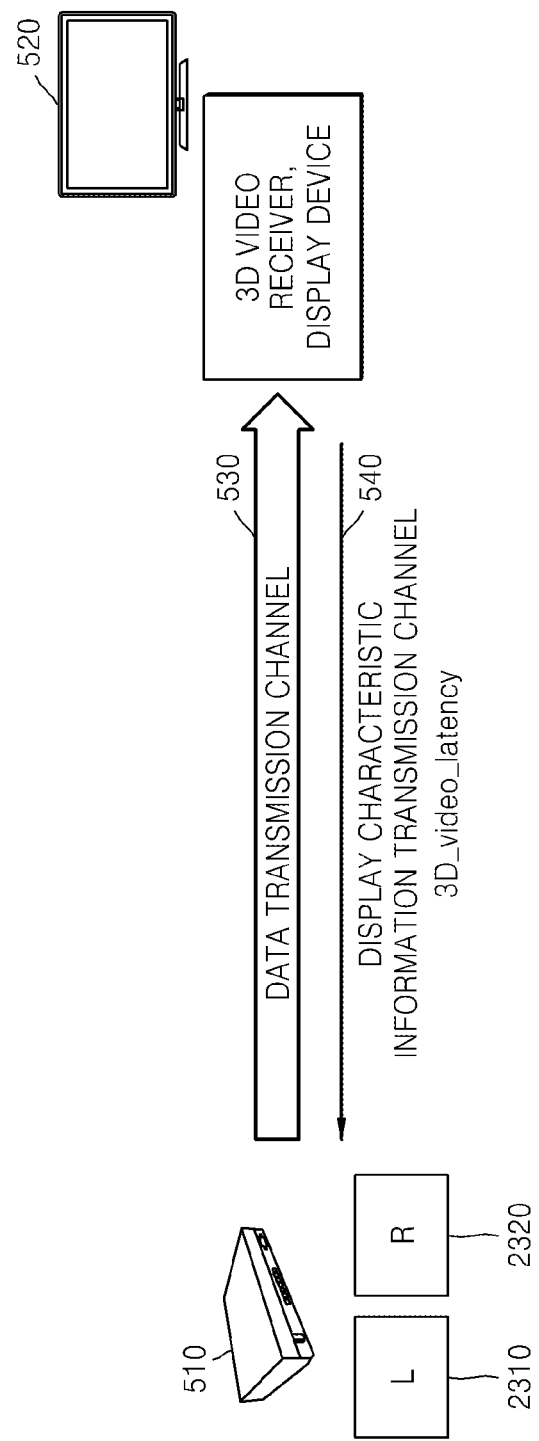
FIG. 23 shows a case in which a source device and a sink device according to an exemplary embodiment transmit and receive 3D video latency information through a display interface.

FIG. 23 shows a case in which the source device 510 and the sink device 520 according to an exemplary embodiment transmit and receive 3D video latency information through a display interface.

Basic video latency information 'Video_latency' and basic audio latency information 'Audio_latency' are transmitted through a vendor specific data block of HDMI-based EDID data.

The sink device 520 may transmit 3D video latency information of the sink device 520 through the display characteristic information transmission channel 540 of the display interface.

The source device 510 may receive the 3D video latency information from the sink device 520 through the display characteristic information transmission channel 540 of the display interface and read a latency time required for the sink device 520 to perform 3D reproduction of received uncompressed 3D video data 2310 and 2320.

For example, the source device 510 may read a latency time due to a 3D video reconstruction operation, a latency time due to a 2D/3D transform operation, and a latency time due to a new view generation operation of a multi-view video format of the sink device 520 from the 3D video latency information.

The source device 510 may determine a total latency time occurring when 3D video is reproduced by the sink device 520, based on the 3D video latency information.

For example, the total latency time occurring when the 3D video is reproduced by the sink device 520 may be determined by summing a basic video latency time indicated by the video latency information 'Video_latency' read from the vendor specific data block and a 3D video latency time read from the 3D video latency information.

For example, the source device 510 may determine an output time of other media data so as for other media data to be reproduced with the 3D video to be synchronized and reproduced with the 3D video, based on the total latency time occurring when the 3D video is reproduced by the sink device 520.

Figure 24:
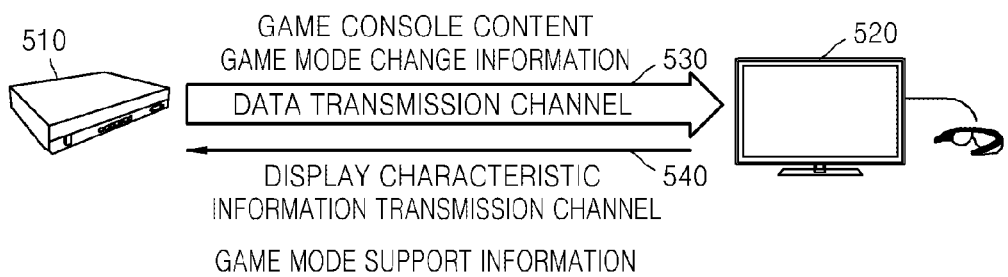
FIG. 24 shows a case in which a source device and a sink device according to an exemplary embodiment transmit and receive game mode change information and game mode support information through a display interface.

FIG. 24 shows a case in which the source device 510 and the sink device 520 according to an exemplary embodiment transmit and receive game mode change information and game mode support information through a display interface.

Referring to FIG. 24, the sink device 520 may transmit game mode support information, which indicates whether the sink device 520 supports the game mode, to the source device 510 through the display characteristic information transmission channel 540 of the display interface. In this case, the source device 510 may be a game console device.

The source device 510 may receive the game mode support information from the sink device 520 through the display characteristic information transmission channel 540 of the display interface and read whether the sink device 520 supports the game mode.

The source device 510 may transmit game console content to the sink device 520 through the data transmission channel 530.

When the sink device 520 supports the game mode, the sink device 520 may reproduce received video in the game mode according to the attribute of video currently transmitted from the source device 510. For example, the source device 510 may transmit game content media to the sink device 520.

In this case, the source device 510 may transmit game mode change information directing the sink device 520 to change its mode to the game mode to the sink device 520 through the data transmission channel 530.

The sink device 520 may receive the game mode change information from the source device 510 through the data transmission channel 530 of the display interface and read whether the sink device 520 changes its mode to the game mode to reproduce video. If there is a change direction to the game mode, the sink device 520 may reproduce received video in the game mode.

Since a video reproduction screen in the sink device 520 must be quickly changed according to a user's input speed in the game mode, a video processing operation in which a latency time occurs may not be performed. Thus, when the sink device 520 reproduces a video in the game mode according to a game mode change direction, the sink device 520 may omit the video processing operation in which a latency time occurs.

Figure 25:
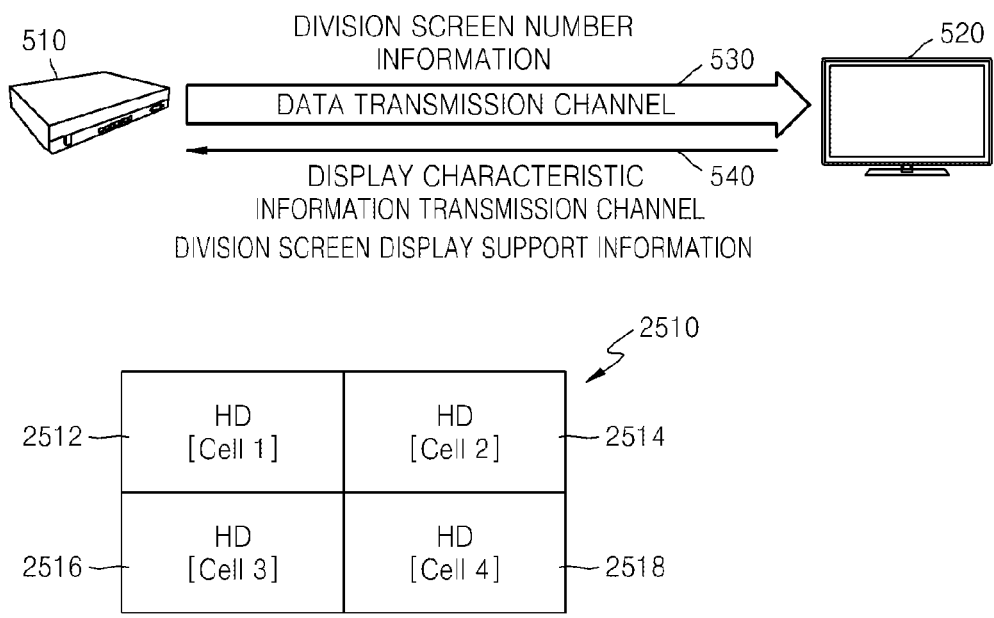
FIG. 25 shows a case in which a source device and a sink device according to an exemplary embodiment transmit and receive screen division information and division screen display support information of division screen data through a display interface.

FIG. 25 shows a case in which the source device 510 and the sink device 520 according to an exemplary embodiment transmit and receive screen division information and division screen display support information of division screen data through a display interface.

Referring to FIG. 25, the sink device 520 may transmit division screen display support information, which indicates whether the sink device 520 has division screen display capability, to the source device 510 through the display characteristic information transmission channel 540 of the display interface.

The source device 510 may receive the division screen display support information from the sink device 520 through the display characteristic information transmission channel 540 of the display interface and read whether the sink device 520 supports a division screen display scheme.

If the sink device 520 has division screen display capability, the source device 510 may transmit division video data obtained by dividing video data of a single screen into a plurality of pieces to the sink device 520. The source device 510 may transmit division screen identification information of division video data 2512, 2514, 2516, and 2518 obtained by dividing video data 2510 of a single screen into a plurality of pieces to the sink device 520 through the data transmission channel 530. The division screen identification information may include division numbers indicating an order by which the division video data 2512, 2514, 2516, and 2518 form the screen.

The sink device 520 may receive the division screen identification information from the source device 510 through the data transmission channel 530 of the display interface and read division numbers of received division video data. The sink device 520 may simultaneously reproduce the division video data so as for the division video data to form a single screen according to the division numbers of the division video data.

When the sink device 520 reproduces video data having resolution of an Ultra Definition (UD) class, the sink device 520 may divide a single screen into a plurality of screens and simultaneously reproduce the divided screens of a High Definition (HD) class. In this case, the source device 510 may divide video data of the UD class corresponding to a single screen into a plurality of pieces of division video data of the HD class corresponding to the divided screens and transmit the plurality of pieces of division video data of the HD class. The sink device 520 may individually receive the plurality of pieces of division video data of the HD class, which correspond to the divided screens, and reproduce the plurality of pieces of division video data to form a single screen.

Figure 26:
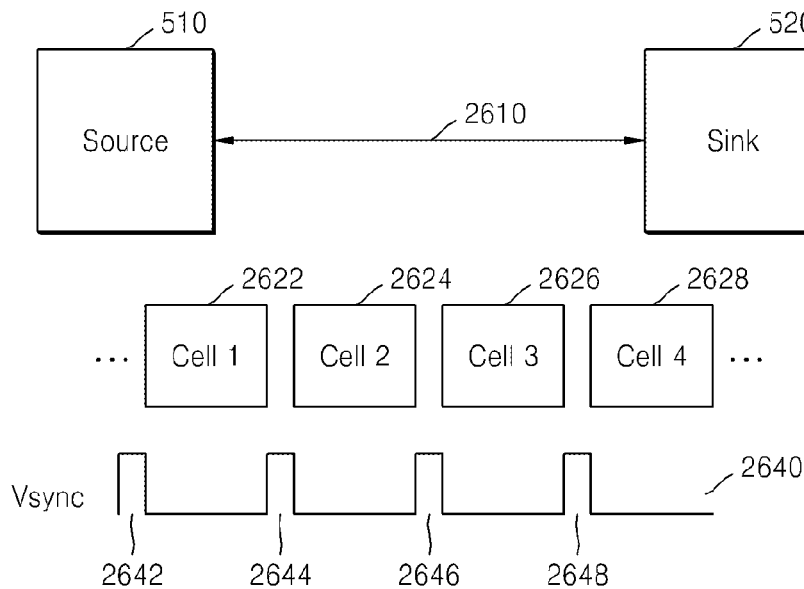
FIG. 26 shows a case in which a source device and a sink device according to an exemplary embodiment transmit and receive division video data for a division screen display through a single display interface.

FIG. 26 shows an illustration in which the source device 510 and the sink device 520 according to an exemplary embodiment transmit and receive division video data 2622, 2624, 2626, and 2628 for a division screen display through a single display interface 2610.

Referring to FIG. 26, the source device 510 may sequentially transmit the division video data 2622, 2624, 2626, and 2628 according to division numbers Cell1, Cell2, Cell3, and Cell4 to the sink device 520 through a data transmission channel of the single display interface 2610. The source device 510 may output the division video data 2622, 2624, 2626, and 2628 for a vertical screen interval by being synchronized with periodically generated vertical synchronization signals 2642, 2644, 2646, and 2648.

The source device 510 may transmit division screen identification information of the division video data 2622, 2624, 2626, and 2628 to the sink device 520 through the data transmission channel of the single display interface 2610. That is, the division screen identification information of the division video data 2622, 2624, 2626, and 2628 respectively following the vertical synchronization signals 2642, 2644, 2646, and 2648 in synchronization with the vertical synchronization signals 2642, 2644, 2646, and 2648 may be transmitted.

The sink device 520 may receive the division screen identification information through the single display interface 2610 every time each of the vertical synchronization signals 2642, 2644, 2646, and 2648 is generated and sequentially receive the division video data 2622, 2624, 2626, and 2628 according to division numbers of the division screen identification information.

The sink device 520 may simultaneously reproduce the division video data 2622, 2624, 2626, and 2628 by arranging the division video data 2622, 2624, 2626, and 2628 on a single screen according to the division numbers.

Figure 27:
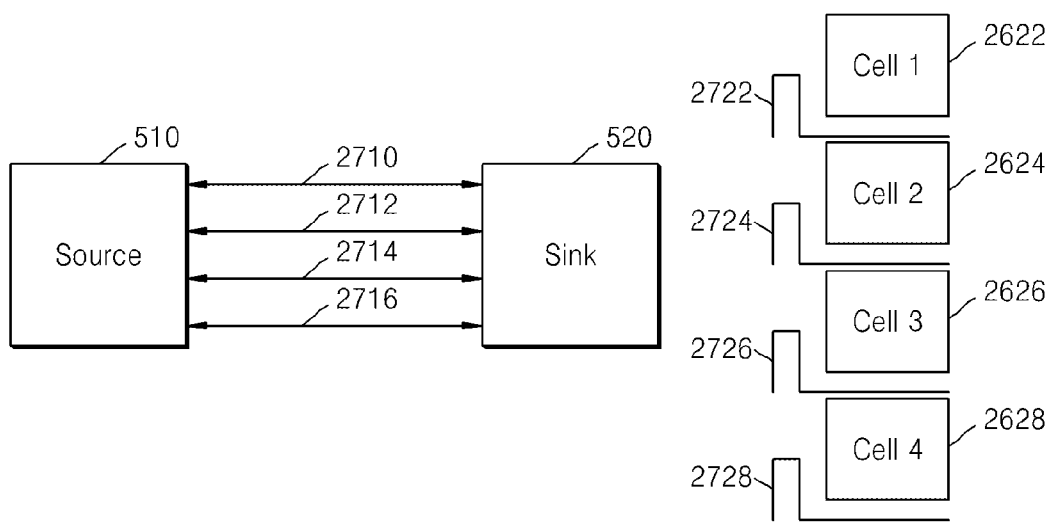
FIG. 27 shows a case in which a source device and a sink device according to an exemplary embodiment transmit and receive division video data for a division screen display through a plurality of display interfaces.

FIG. 27 shows a case in which the source device 510 and the sink device 520 according to an exemplary invention transmit and receive the division video data 2642, 2644, 2646, and 2648 for a division screen display through a plurality of display interfaces 2710, 2712, 2714, and 2716.

Referring to FIG. 27, the source device 510 may transmit the division video data 2642, 2644, 2646, and 2648 to the sink device 520 through corresponding data transmission channels of the plurality of display interfaces 2710, 2712, 2714, and 2716, respectively. The source device 510 may output the division video data 2642, 2644, 2646, and 2648 for a vertical screen interval so as to be synchronized with vertical synchronization signals 2722, 2724, 2726, and 2728 of the respective display interfaces 2710, 2712, 2714, and 2716.

The source device 510 may transmit division screen identification information of the division video data 2642, 2644, 2646, and 2648 following the vertical synchronization signals 2722, 2724, 2726, and 2728 in synchronization with vertical synchronization signals 2722, 2724, 2726, and 2728 through the data transmission channels of the plurality of display interfaces 2710, 2712, 2714, and 2716, respectively.

The sink device 520 may receive the division screen identification information every time each of the vertical synchronization signals 2722, 2724, 2726, and 2728 of the respective display interfaces 2710, 2712, 2714, and 2716 is generated and receive the division video data 2622, 2624, 2626, and 2628 according to division numbers of the division screen identification information.

The sink device 520 may simultaneously reproduce the division video data 2622, 2624, 2626, and 2628 by arranging the division video data 2622, 2624, 2626, and 2628 on a single screen according to the division numbers.

Figure 28:
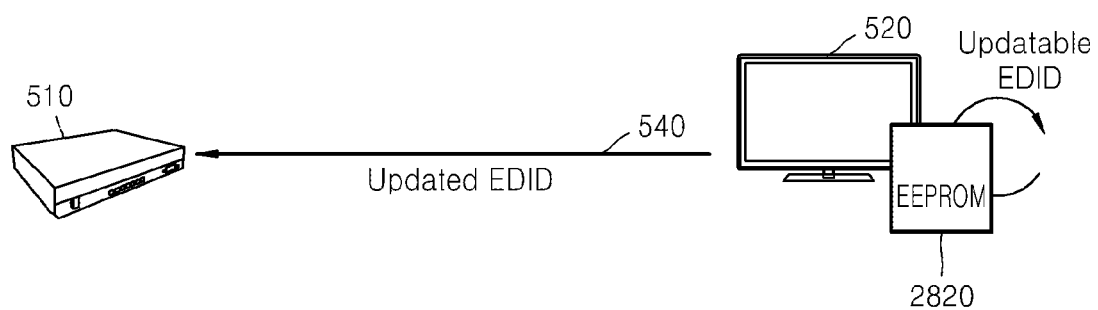
FIG. 28 shows a case in which a source device and a sink device according to an exemplary embodiment transmit and receive updated display characteristic information through a display interface.

FIG. 28 shows a case in which the source device 510 and the sink device 520 according to an exemplary embodiment of the present invention transmit and receive updated display characteristic information through a display interface.

Referring to FIG. 28, the sink device 520 may transmit updatable 3D display characteristic information of the sink device 520 through the display characteristic information transmission channel 540 of the display interface.

3D display characteristic information updated by the sink device 520 may be stored in an Electrically Erasable Programmable Read-Only Memory (EEPROM) 2820. The 3D display characteristic information updated by the sink device 520 may be updated every time the sink device 520 is turned on or every time the display interface is connected and may be newly stored in the EEPROM 2820.

The updatable 3D display characteristic information may include user 3D usage information, which is updated every time a user's usage pattern is changed, based on at least one of a user's usage frequency and a user's current usage pattern of the sink device 520.

For example, the user 3D usage information may include at least one of information regarding a watching distance when a user watches 3D media, information regarding a watching age of the user watching the 3D media, and information regarding 3D glasses of the user, wherein all pieces of information are registered in the sink device 300.

The information regarding a 3D watching distance may include a mean watching distance measured by monitoring a 3D watching position of the user from time to time.

Every time the watching age of the user or the 3D glasses information, which is registered in the sink device 520, is changed, the 3D watching age information or the 3D glasses information of the user 3D usage information may be updated.

The source device 510 may receive the updatable 3D display characteristic information from the sink device 520 through the display characteristic information transmission channel 540 of the display interface and extract the user 3D usage information updatable at an arbitrary time.

For example, if the source device 510 receives the user 3D usage information at an arbitrary time and reads that the user's usage pattern of the sink device 520 has been updated, the source device 510 may read a current user preference and a current 3D usage pattern from the updated 3D display characteristic information and re-determine uncompressed media data to be transmitted to the sink device 520 based on the current user preference and the current 3D usage pattern.

Hereinafter, InfoFrame as an illustrative format of media auxiliary data including 3D video reproduction information according to an exemplary embodiment and EDID data as an illustrative format of display characteristic data including display characteristic information according to an exemplary embodiment are described in detail with reference to FIGS. 29 to 31.

FIG. 29 illustrates an extended format of an AVI InfoFrame for transmitting and receiving 3D video reproduction information according to an exemplary embodiment. Referring to FIG. 29, the source device 100 or 510 and the sink device 200 or 520 may transmit and receive an InfoFrame including 3D video reproduction information and media reproduction information defined according to an exemplary embodiment through a data transmission channel of an HDMI-based display interface.

For example, the source device 100 or 510 may generate an AVI InfoFrame 2900 by extending a data field 2910 of the AVI InfoFrame type 610 in the CEA 861-based InfoFrame type table 600 and insert 3D video reproduction information '3D_parameter' 2920 according to an exemplary embodiment into the extended data field 2910. Media reproduction information according to an exemplary embodiment may also be inserted into the extended data field 2910 of the AVI InfoFrame type 610.

The AVI InfoFrame 2900 including the extended data field 2910 may be transmitted from the source device 100 or 510 to the sink device 200 or 520 through the data transmission channel of the HDMI-based display interface.

The sink device 200 or 520 may extract and read the 3D video reproduction information '3D_parameter' 2920 from the data field 2910 of the AVI InfoFrame 2900. The sink device 200 or 520 may extract and read the media reproduction information from the data field 2910 of the AVI InfoFrame 2900.

For another example, the source device 100 or 510 may insert at least one of the 3D video reproduction information '3D_parameter' 2920 and the media reproduction information into a reserved InfoFrame by using the reserved InfoFrame type 620 in the CEA 861-based InfoFrame type table 600.

The reserved InfoFrame including the 3D video reproduction information '3D_parameter' 2920 and the media reproduction information may be transmitted from the source device 100 or 510 to the sink device 200 or 520 through the data transmission channel of the HDMI-based display interface.

The sink device 200 or 520 may extract and read at least one of the 3D video reproduction information '3D_parameter' 2920 and the media reproduction information from the reserved InfoFrame.

The source device 400 or 510 and the sink device 300 or 520 may transmit and receive E-EDID data including 3D display characteristic information and display characteristic information of the sink device 300 or 520, which are defined according to an exemplary embodiment, through an HDMI-based display interface.

Figure 30:
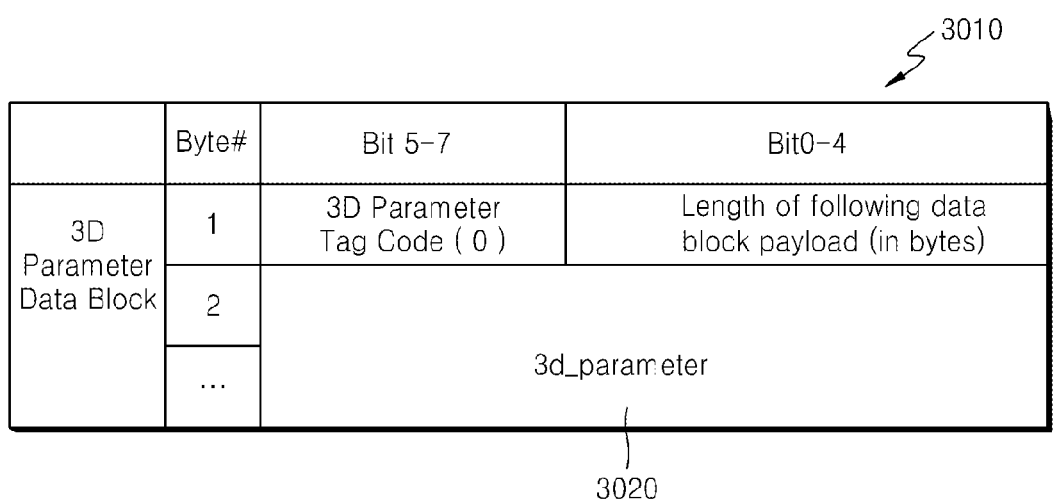
FIG. 30 shows a case in which a reserved data block of EDID data is used to transmit and receive 3D display characteristic information according to an exemplary embodiment.

FIG. 30 shows a case in which the reserved data block 1110 or 1140 of the E-EDID data 1000 is used to transmit and receive 3D display characteristic information according to an exemplary embodiment.

Referring to FIG. 30, the sink device 300 or 520 may generate a 3D parameter data block 3010 by using the reserved data block 1110 or 1140 of the CEA extension data 1020 or 1030 of the E-EDID data 1000 and insert at least one of 3D display characteristic information '3D_parameter' 3020 and display characteristic information of the sink device 300 or 520, which are defined according to an exemplary embodiment, into the 3D parameter data block 3010.

The E-EDID data 1000 including the 3D parameter data block 3010 may be transmitted from the sink device 300 or 520 to the source device 400 or 510 through a data transmission channel of an HDMI-based display interface.

The source device 400 or 510 may extract and read at least one of the 3D display characteristic information '3D_parameter' 3020 and the display characteristic information from the 3D parameter data block 3010 defined by using the reserved data block 1110 or 1140 of the CEA extension data 1020 or 1030.

FIG. 31 shows a case in which a user extension data block of E-EDID data is used to transmit and receive 3D display characteristic information according to an exemplary embodiment.

Referring to FIG. 31, the sink device 300 or 520 may generate a 3D parameter data block 3110 by using the user extension data block 1120 of the CEA extension data 1020 or 1030 and insert at least one of 3D display characteristic information '3D_parameter' 3120 and display characteristic information of the sink device 300 or 520, which are defined according to an exemplary embodiment, into the 3D parameter data block 3110.

The 3D parameter data block 3110 may be generated by using a video-related data block 3140 in a data block type table 3130 of the user extension data block 1120.

E-EDID data including the 3D parameter data block 3110 may be transmitted from the sink device 300 or 520 to the source device 400 or 510 through a data transmission channel of an HDMI-based display interface.

The source device 400 or 510 may extract and read at least one of the 3D display characteristic information '3D_parameter' 3120 and the display characteristic information from the 3D parameter data block 3110 defined by using the user extension data block 1120 of the CEA extension data 1020 or 1030.

Figure 32:
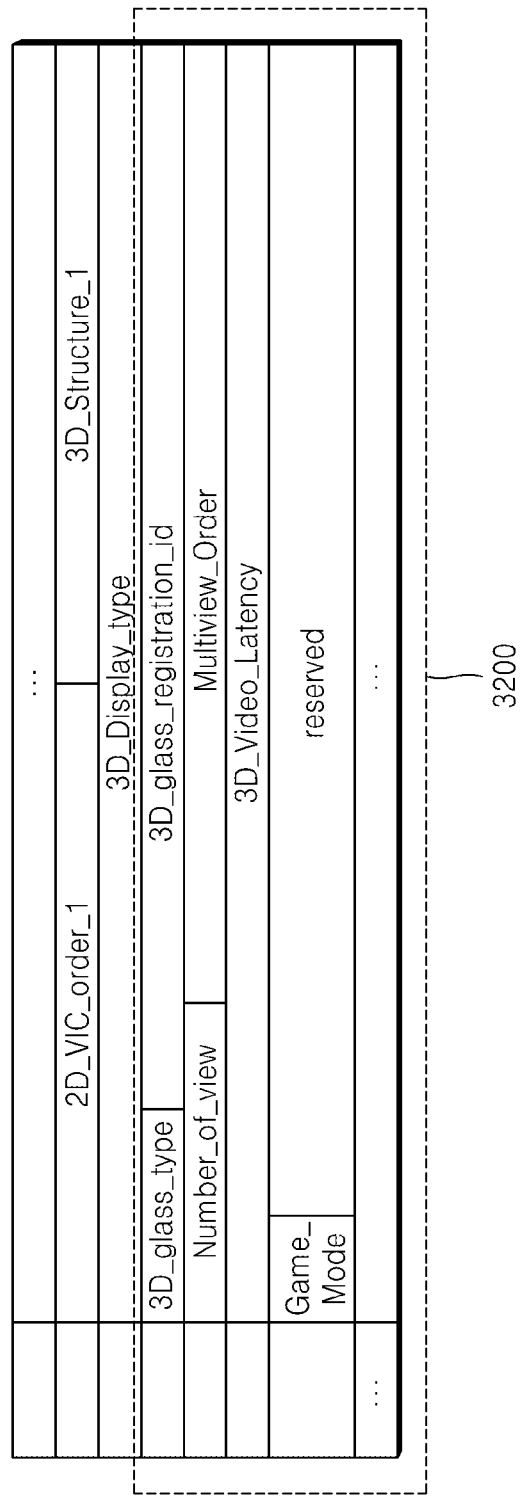
FIG. 32 illustrates a format in which a reserved field of a vendor specific data block is extended to transmit and receive 3D display characteristic information.

FIG. 32 illustrates a format in which a reserved field of a vendor specific data block is extended to transmit and receive 3D display characteristic information.

Referring to FIG. 32, the source device 400 or 510 may insert at least one of 3D display characteristic information and display characteristic information of the sink device 300 or 520, which are defined according to an exemplary embodiment, into the reserved field 1310 of the vendor specific data block extension 1300 that is extended from the vendor specific data block format 1210 of E-EDID data.

For example, a display characteristic information set 3200 including the 3D display characteristic information and the display characteristic information may be transmitted through the reserved field 1310 of the vendor specific data block extension 1300. The display characteristic information set 3200 may include 3D video format support information '3D_Display_type', 3D glasses information '3D_glass_type', 3D glasses registration identification information '3D_glass_registration_id', information regarding the number of views of a multi-view video format 'Number_of_view', information regarding a view order of the multi-view video format 'Multiview_Order', 3D video latency information '3D_Video_Latency', and game mode support information 'Game_mode'.

The E-EDID data including the vendor specific data block extension 1300 in which the display characteristic information set 3200 is inserted may be transmitted from the sink device 300 or 520 to the source device 400 or 510 through a data transmission channel of an HDMI-based display interface.

The source device 400 or 510 may extract and read the display characteristic information set 3200 from the vendor specific data block extension 1300 of the CEA extension data 1020 or 1030.

Figure 33:
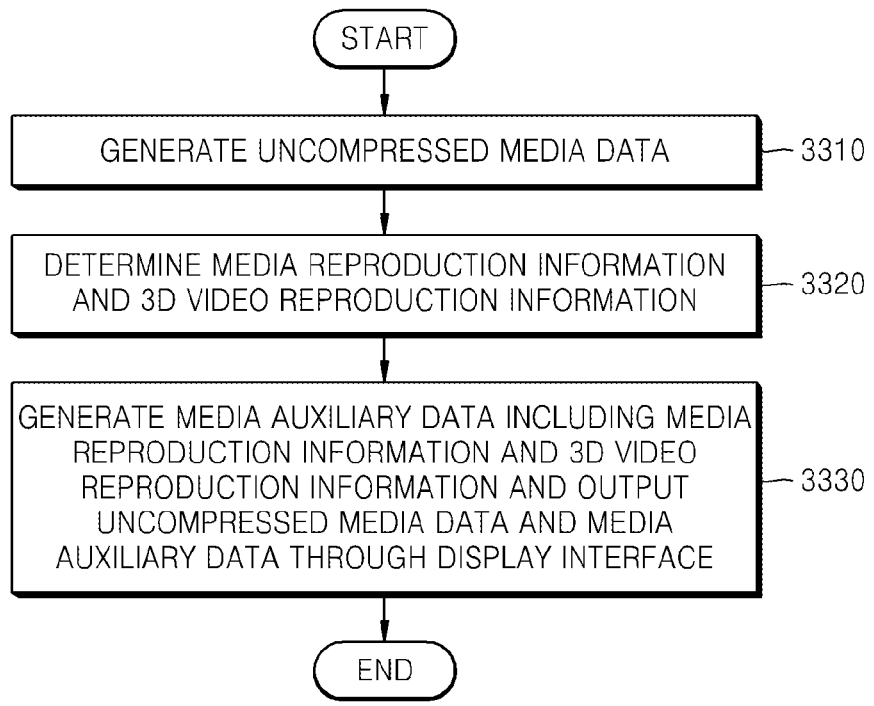
FIG. 33 is a flowchart of a method of transmitting a multimedia service by a source device through a display interface according to an exemplary embodiment.

FIG. 33 is a flowchart of a method of transmitting a multimedia service by a source device through a display interface according to an exemplary embodiment.

Referring to FIG. 33, in operation 3310, uncompressed media data of media provided in the multimedia service is generated. The uncompressed media data may be output by encoding media data received from the outside.

In operation 3320, media reproduction information for a sink device to reproduce the media and 3D video reproduction information for the sink device to reproduce 3D video are determined.

The 3D video reproduction information may include at least one of 3D video transfer format information and 3D screen maximum disparity information.

The 3D video transfer format information may include at least one of frame/field sequential format information, left/right identification information, and left/right order information. The 3D video transfer format information may also include multi-view video format information.

The media reproduction information may include game mode change information and division screen identification information.

In operation 3330, media auxiliary data including at least one of the media reproduction information and the 3D video reproduction information and having a data structure recognizable by the sink device is generated. The uncompressed media data and the media auxiliary data may be output through the display interface.

The media auxiliary data may have an InfoFrame data format. At least one of the media reproduction information and the 3D video reproduction information may be transmitted through an AVI InfoFrame, a vendor specific InfoFrame, or a reserved InfoFrame.

Figure 34:
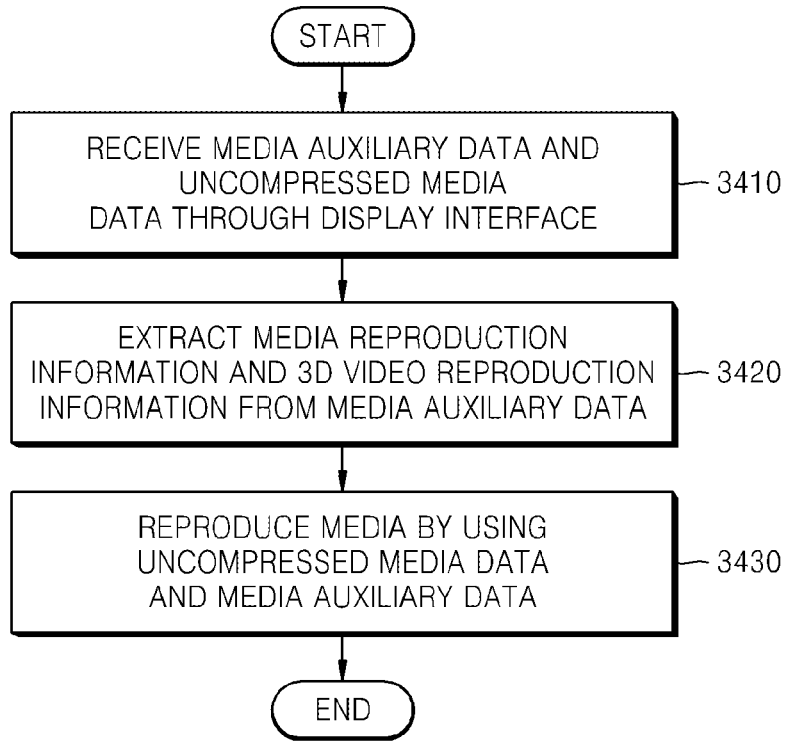
FIG. 34 is a flowchart of a method of receiving a multimedia service by a sink device through a display interface, according to an exemplary embodiment.

FIG. 34 is a flowchart of a method of receiving a multimedia service by a sink device through a display interface according to an exemplary embodiment.

Referring to FIG. 34, in operation 3410, media auxiliary data having a data structure recognizable by the sink device and uncompressed media data of media provided in the multimedia service are received from a source device through the display interface.

In operation 3420, at least one of media reproduction information and 3D video reproduction information is extracted from the media auxiliary data. The media auxiliary data may have an InfoFrame data format. At least one of the media reproduction information and the 3D video reproduction information may be extracted from an AVI InfoFrame, a vendor specific InfoFrame, or a reserved InfoFrame.

At least one of 3D video transfer format information and 3D screen maximum disparity information may be extracted from the 3D video reproduction information. At least one of frame/field sequential format information, left/right identification information, and left/right order information may be extracted from the 3D video transfer format information, and multi-view video format information may also be extracted from the 3D video transfer format information.

Game mode change information and division screen identification information may be extracted from the media reproduction information.

In operation 3430, the media is reproduced by using the uncompressed media data based on at least one of the media reproduction information and the 3D video reproduction information.

For example, if video data received based on 3D video format support information is read as a frame/field sequential format, left-view video data and right-view video data of 3D video may be alternately received one by one in every vertical screen interval. Also, if the video data received based on the 3D video format support information is read as a multi-view video format, multi-view video data having three or more views may be received. The sink device may reproduce the received video data as it is or transform a format of the received video data to a reproduction format reproducible by the sink device and reproduce the transformed video data.

Application data having a disparity greater than the maximum disparity may be additionally synthesized on a reproduction screen of 3D media based on the received 3D screen maximum disparity information.

The sink device may change to the game mode and reproduce game content based on the received game mode change information.

Based on the division screen identification information, the sink device may form a single screen with a plurality of pieces of division video data sequentially received through a single display interface or respectively received through a plurality of display interfaces and reproduce the division video data.

Figure 35:
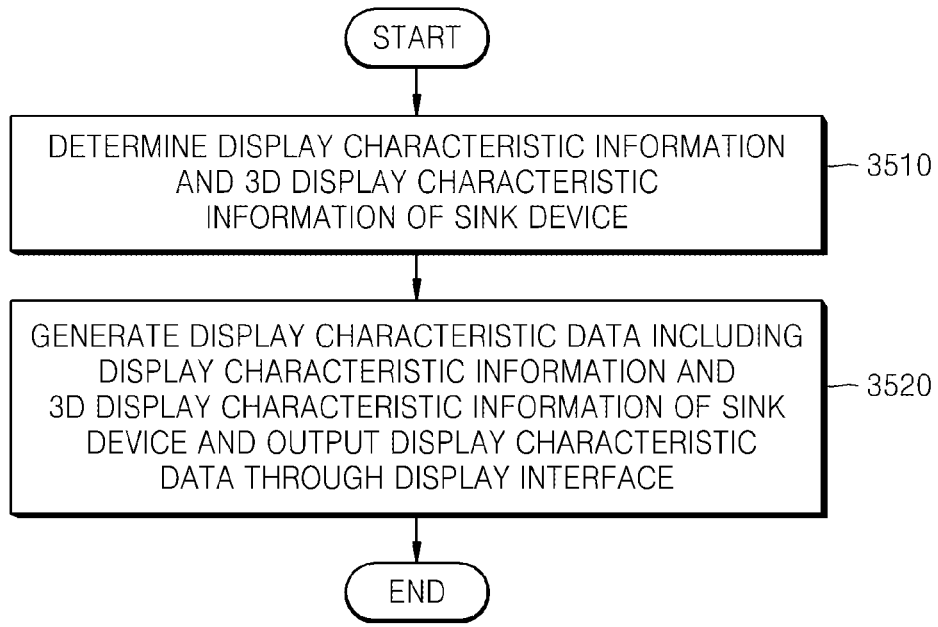
FIG. 35 is a flowchart of a method of transmitting display characteristic data by a sink device through a display interface, according to an exemplary embodiment.

FIG. 35 is a flowchart of a method of transmitting display characteristic data by a sink device through a display interface according to an exemplary embodiment.

Referring to FIG. 35, in operation 3510, at least one of display characteristic information of the sink device for reproducing media provided in a multimedia service and 3D display characteristic information of the sink device for reproducing 3D video provided in the multimedia service is determined.

In operation 3520, display characteristic data including at least one of the display characteristic information and the 3D display characteristic information and having a data structure recognizable by a source device is generated. The display characteristic data is output through the display interface and transmitted to the source device.

The 3D display characteristic information of the sink device may include 3D video format support information including frame/field sequential format information and multi-view video format information. The 3D video format support information may further include at least one of left/right identification information and left/right order information of a frame/field sequential format. The 3D video format support information may further include at least one of view number information and view order information of a multi-view video format.

The 3D display characteristic information of the sink device may include 3D video depth adjustment information including at least one of information regarding a display size of the sink device and information regarding a pixel interval size of the sink device. The 3D display characteristic information of the sink device may include 3D video latency information.

The display characteristic information of the sink device may include game mode support information, division screen display support information, and frequently updatable 3D display characteristic information.

If the display characteristic data is E-EDID data, the display characteristic information and the 3D display characteristic information may be transmitted by using a reserved data block, a user extension data block, and an extended data filed of a vendor specific data block of the E-EDID data.

Figure 36:
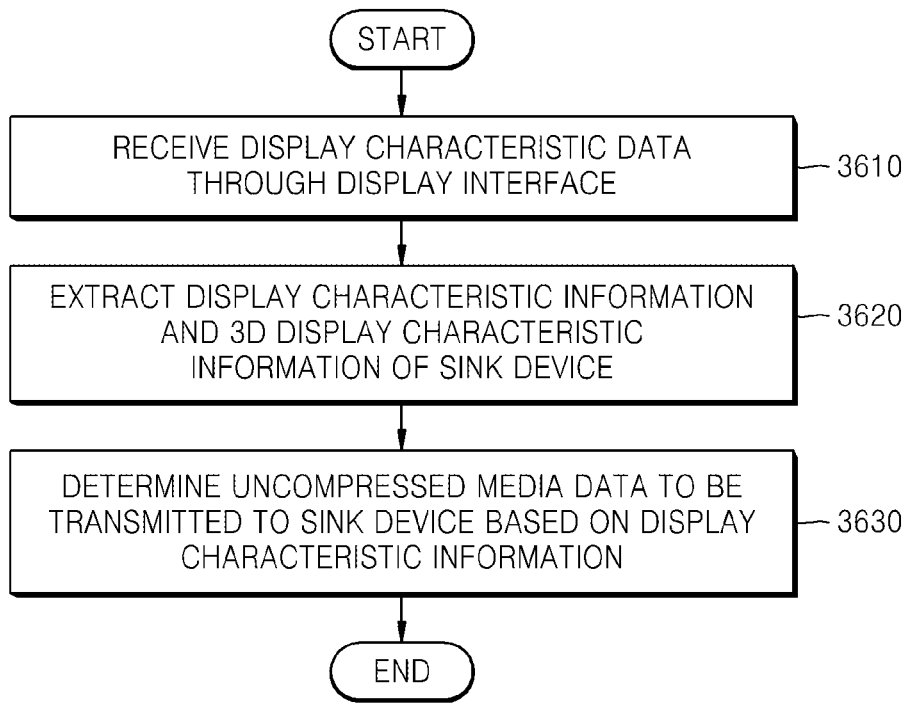
FIG. 36 is a flowchart of a method of receiving display characteristic data by a source device through a display interface, according to an exemplary embodiment.

FIG. 36 is a flowchart of a method of receiving display characteristic data by a source device through a display interface according to an exemplary embodiment.

Referring to FIG. 36, in operation 3610, display characteristic data having a data structure recognizable by the source device is received from a sink device through the display interface. In operation 3620, at least one of display characteristic information and 3D display characteristic information is extracted from the display characteristic data.

If the display characteristic data is E-EDID data, the 3D display characteristic information and the display characteristic information may be extracted from a reserved data block, a user extension data block, and an extended data filed of a vendor specific data block of the E-EDID data.

In operation 3630, uncompressed media data to be transmitted to the sink device is determined based on at least one of the display characteristic information and the 3D display characteristic information. The determined uncompressed media data may be output through the display interface to be transmitted to the sink device or stored in a storage medium.

3D video format support information including at least one of a frame/field sequential format and a multi-view video format may be extracted from the 3D display characteristic information of the sink device. It may be determined to output uncompressed video data of a 3D video transfer format supported by the sink device based on the 3D video format support information. Uncompressed video data of a 3D video transfer format supported by the sink device may be generated and transmitted to the sink device.

3D video depth adjustment information may be extracted from the 3D display characteristic information of the sink device, wherein depths of left-view video and right-view video of 3D video are adjusted based on at least one determined from a display size and a pixel interval size of the sink device.

3D video latency information of the sink device may be extracted from the 3D display characteristic information of the sink device, wherein a total latency time occurring for the sink device to reproduce 3D video is determined. An output time of other media data may be adjusted by considering the total latency time for the 3D video reproduction of the sink device.

Game mode support information of the sink device may be extracted from the display characteristic information of the sink device.

Division screen display support information of the sink device may be extracted from the display characteristic information of the sink device. If the sink device has division screen display capability, the source device may sequentially transmit a plurality of pieces of division video data through a single display interface or respectively transmit the plurality of pieces of division video data through a plurality of display interfaces.

Frequently updatable 3D display characteristic information may be extracted from the 3D display characteristic information of the sink device, and frequently updatable user 3D usage information may be extracted from the updatable 3D display characteristic information. The source device may re-determine uncompressed media data based on updated user 3D usage information and transmit the re-determined uncompressed media data to the sink device.

As described above, media reproduction information according to an exemplary embodiment and 3D video reproduction information according to an exemplary embodiment, which are required for a sink device to reproduce media data, may be transmitted from a source device to the sink device through a display interface for transmission of uncompressed media data according to an exemplary embodiment.

In addition, since the media reproduction information and the 3D video reproduction information can be transmitted and received by using a reserved space of an InfoFrame according to a display interface standard, compatibility to other source devices and other sink devices according to the display interface standard can be guaranteed.

3D display characteristic information according to an exemplary embodiment and display characteristic information according to an exemplary embodiment, which include information regarding display capability of recognizing and reproducing media data by a sink device, may be transmitted from the sink device to a source device through a display interface for transmission of uncompressed media data.

In addition, since the 3D display characteristic information and the display characteristic information can be transmitted and received by using a reserved space of E-EDID data according to a display interface standard, compatibility to other source devices and other sink devices according to the display interface standard can be guaranteed.

A source device may transmit suitable 3D video data to a sink device by considering a user's usage pattern of the sink device, which is frequently changed, based on updatable 3D display characteristic information according to an exemplary embodiment.

Based on game mode support information of a sink device, when the sink device reproduces video provided in a console game, a source device may change a video reproduction mode of the sink device to a game mode so that the sink device can quickly respond to a user input.

A source device may adjust a depth of 3D video based on a display size or a pixel interval size of a sink device and provide video data suitable for the sink device to the sink device.

A source device may read a 3D video latency time of a sink device based on 3D video latency information of the sink device and synchronize a media reproduction time between the sink device and another media reproduction device.

A source device may provide division video data to a sink device based on whether the sink device has division screen display capability, and the sink device may form a single screen with the division video data and reproduce the division video data.

As described above, various usage examples of media reproduction information according to an exemplary embodiment, 3D video reproduction information according to an exemplary embodiment, 3D display characteristic information according to an exemplary embodiment, and display characteristic information according to an exemplary embodiment have been described. However, since the above-described usage examples are only embodiments to describe the principle, the media reproduction information according to an exemplary embodiment, the 3D video reproduction information according to an exemplary embodiment, the 3D display characteristic information according to an exemplary embodiment, and the display characteristic information according to an exemplary embodiment are not limited to the aspects described in FIGS. 1 to 36.

The block diagrams illustrated herein may be analyzed by one of ordinary skill in the art as aspects in which circuits to implement the principle of exemplary embodiments are conceptually represented. Similarly, it will be understood by one of ordinary skill in the art that arbitrary flowcharts, state transition diagrams, and pseudo-codes are substantially represented in a computer-readable medium to indicate various processes executable by a computer or processor regardless of whether the computer or processor is explicitly shown. Thus, the embodiments can be written as computer programs and can be implemented in general-use digital computers that execute the programs using a computer-readable recording medium. Examples of the computer-readable recording medium include storage media such as magnetic storage media (e.g., ROM, floppy disks, hard disks, etc.) and optical recording media (e.g., CD-ROMs, or DVDs).

Functions of various elements shown in the drawings can be provided by using not only hardware for executing software but also exclusive hardware in association with proper software. When the functions are provided by a processor, the functions can be provided by a single exclusive processor, a single shared processor, or a plurality of individual processors, a portion of which can be shared. In addition, the explicit use of the term "processor" or "controller" should not be analyzed as exclusively indicating hardware for executing software and may implicitly include Digital Signal Processor (DSP) hardware, a ROM for storing software, and a nonvolatile storage device.

An element represented as a means for performing a specific function in the claims of the specification may include an arbitrary method for performing the specific function, and such an element may include an arbitrary form of software including firmware and microcode combined with a set of circuit elements for performing the specific function or a circuit suitable to execute software for performing the specific function.

In the specification, 'an embodiment' and various modifications of such an expression mean that specific feature, structure, and characteristic related to the embodiment is included in at least one embodiment. Thus, all of the expression 'in an embodiment' and other arbitrary modifications described all over the specification do not necessarily indicate the same embodiment.

In the specification, in a case of 'at least one of A and B', the expression 'at least one of' is used to include selection of only the first option A, selection of only the second option B, or selection of both options A and B. As an additional example, a case of 'at least one of A, B, and C' may include selection of only first option A, selection of only the second option B, selection of only the second option C, selection of only the first and second options A and B, selection of only the second and third options B and C, or selection of all of the three option A, B, and C. Even a case of more items than three can be clearly extended and analyzed by one of ordinary skill in the art.

While exemplary embodiments have been particularly shown and described herein, it will be understood by those of ordinary skill in the art that various changes in form and details may be made therein without departing from the spirit and scope of the inventive concept as defined by the appended claims. The embodiments should be considered in descriptive sense only and not for purposes of limitation.

What is claimed is:

1. A method of receiving a multimedia service at a sink device through a display interface, the method comprising:
   receiving, through the display interface from a source device, media auxiliary data in a data structure recognizable by the sink device and uncompressed media data corresponding to media provided by the multimedia service;
   sequentially receiving a plurality of pieces of division video data through a single display interface according to division numbers of division screen identification information;
   receiving division screen identification information of division video data following a vertical synchronization signal at a vertical synchronization signal generation time between each two pieces of the plurality of pieces of division video data;
   extracting from the media auxiliary data at least one of reproduction information to enable the sink device to receive and reproduce the media and 3D video reproduction information to enable the sink device to receive and reproduce 3D video; and
   extracting, from the reproduction information, division screen identification information of division video data obtained by dividing video data of a single screen into the plurality of pieces.

2. The method of claim 1, further comprising reproducing the media using the uncompressed media data and at least one of the reproduction information and the 3D video reproduction information.

3. The method of claim 1, wherein the uncompressed media data comprises 3D video and extracting comprises extracting 3D video reproduction information comprising at least one of 3D video transfer format providing information, which indicates a video format of left-view video data and right-view video data of the 3D video, and 3D screen maximum disparity information, which indicates the maximum disparity in a 3D screen of the 3D video.

4. The method of claim 3, wherein the extracting of the 3D video reproduction information comprises determining that the received uncompressed media data has a frame/field sequential format based on the 3D video transfer format providing information, and
   the receiving comprises alternately receiving left-view video data and right-view video data of the 3D video in every vertical screen interval.

5. The method of claim 4, wherein the extracting of the 3D video reproduction information comprises determining whether video data transmitted in a current vertical screen interval is left-view video data or right-view video data based on the 3D video transfer format providing information.

6. The method of claim 4, wherein the extracting of the 3D video reproduction information comprises determining an order of a current frame among a pair of left-view frame and right-view frame based the 3D video transfer format providing information.

7. The method of claim 4, wherein the extracting comprises determining that the received uncompressed media data has a multi-view video format based on the 3D video transfer format providing information, and
   the receiving comprises receiving multi-view video data corresponding to three or more views.

8. The method of claim 1, wherein the extracting comprises determining the maximum disparity in a 3D screen formed by synthesizing at least one of per-view video data, subtitle data, and application data of the 3D video output by the source device based on the 3D screen maximum disparity information.

9. The method of claim 8, further comprising:
   reproducing 3D media by using the uncompressed media data based on at least one of the reproduction information and the 3D video reproduction information; and
   synthesizing application data having a disparity greater than the maximum disparity with a reproduction screen of the 3D media based on the maximum disparity.

10. The method of claim 1, wherein the extracting comprises extracting, from the reproduction information, game mode change information for directing the sink device to change to a game mode.

11. The method of claim 10, further comprising:
    reproducing the media using the uncompressed media data based on at least one of the reproduction information and the 3D video reproduction information; and
    reproducing the media in the game mode based on the game mode change information.

12. The method of claim 1, further comprising:
    reproducing the media using the uncompressed media data based on at least one of the reproduction information and the 3D video reproduction information; and
    forming a single screen with the plurality of pieces of division video data based on the division screen identification information of the division video data.

13. The method of claim 1, wherein the receiving comprises:
    receiving division screen identification information of division video data following a vertical synchronization signal at a vertical synchronization signal generation time through a plurality of display interfaces; and
    respectively receiving the plurality of pieces of division video data through the plurality of display interfaces.

14. The method of claim 1, wherein the media auxiliary data comprises Auxiliary Video InfoFrame (AVI) data, and
    the extracting comprises extracting the 3D video reproduction information from an extended data field of the AVI InfoFrame.

15. The method of claim 1, wherein the media auxiliary data comprises receiving InfoFrame data, and
   the extracting comprises extracting the 3D video reproduction information from at least one of a reserved InfoFrame and a user extension InfoFrame of the InfoFrame.

16. A non-transitory computer-readable recording medium storing a computer-readable program for implementing the method of claim 1.

17. A sink device which receives a multimedia service through a display interface, the sink device comprising:
   a media related data receiver which receives, through the display interface from a source device, media auxiliary data in a data structure recognizable by the sink device and uncompressed media data corresponding to media provided in the multimedia service, and sequentially receives a plurality of pieces of division video data through a single display interface according to division numbers of division screen identification information, and receives division screen identification information of division video data following a vertical synchronization signal at a vertical synchronization signal generation time between each two pieces of the plurality of pieces of division video data; and
   a reproduction information extractor which extracts from the media auxiliary data at least one of reproduction information to enable the sink device to receive and reproduce the media and 3D video reproduction information to enable the sink device to receive and reproduce the 3D video, and extracts, from the reproduction information, division screen identification information of division video data obtained by dividing video data of a single screen into the plurality of pieces.

18. The sink device of claim 17, further comprising a media reproducing unit which reproduces the media using the uncompressed media data based on at least one of the reproduction information and the 3D video reproduction information.

* * * * *